United States Patent
Sutardja

(10) Patent No.: US 12,380,027 B2
(45) Date of Patent: *Aug. 5, 2025

(54) METHOD AND APPARATUS FOR USING A STORAGE SYSTEM AS MAIN MEMORY

(71) Applicant: FLC Technology Group, Inc., Santa Clara, CA (US)

(72) Inventor: Sehat Sutardja, Las Vegas, NV (US)

(73) Assignee: FLC Technology Group, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,944

(22) Filed: Jan. 5, 2024

(65) Prior Publication Data

US 2024/0220411 A1    Jul. 4, 2024

Related U.S. Application Data

(63) Continuation of application No. 18/094,228, filed on Jan. 6, 2023, now Pat. No. 11,880,305, which is a
(Continued)

(51) Int. Cl.
*G06F 12/0811* (2016.01)
*G06F 9/38* (2018.01)
(Continued)

(52) U.S. Cl.
CPC ........ *G06F 12/0811* (2013.01); *G06F 9/3816* (2013.01); *G06F 9/5077* (2013.01);
(Continued)

(58) Field of Classification Search
None
See application file for complete search history.

(56) References Cited

U.S. PATENT DOCUMENTS

| 6,070,252 A | 5/2000 | Xu et al. |
| 6,249,893 B1 | 6/2001 | Rajsuman et al. |

(Continued)

FOREIGN PATENT DOCUMENTS

| JP | 2004/192615 A | 7/2004 |
| JP | 2003/067357 A | 10/2004 |

(Continued)

OTHER PUBLICATIONS

U.S. Appl. No. 61/987,947, filed May 2014, Sutardja.
(Continued)

*Primary Examiner* — Brian R Peugh
(74) *Attorney, Agent, or Firm* — Command IP LLP; Pejman Yedidsion

(57) ABSTRACT

A data access system including a processor, multiple cache modules for the main memory, and a storage drive. The cache modules include a FLC controller and a main memory cache. The multiple cache modules function as main memory. The processor sends read/write requests (with physical address) to the cache module. The cache module includes two or more stages with each stage including a FLC controller and DRAM (with associated controller). If the first stage FLC module does not include the physical address, the request is forwarded to a second stage FLC module. If the second stage FLC module does not include the physical address, the request is forwarded to the storage drive, a partition reserved for main memory. The first stage FLC module has high speed, lower power operation while the second stage FLC is a low-cost implementation. Multiple FLC modules may connect to the processor in parallel.

17 Claims, 14 Drawing Sheets

Related U.S. Application Data continuation of application No. 17/180,530, filed on Feb. 19, 2021, now Pat. No. 11,556,469, which is a continuation of application No. 16/444,556, filed on Jun. 18, 2019, now Pat. No. 10,936,492.

(60) Provisional application No. 62/686,333, filed on Jun. 18, 2018.

(51) Int. Cl.
*G06F 9/50* (2006.01)
*G06F 12/0846* (2016.01)
*G06F 12/1009* (2016.01)
*G06F 12/0897* (2016.01)

(52) U.S. Cl.
CPC ...... *G06F 12/0851* (2013.01); *G06F 12/1009* (2013.01); *G06F 12/0897* (2013.01)

(56) References Cited

U.S. PATENT DOCUMENTS

| | | |
|---|---|---|
| 6,490,658 B1 | 12/2002 | Ahmed |
| 6,658,538 B2 | 12/2003 | Arimilli et al. |
| 6,795,894 B1 | 9/2004 | Neufeld et al. |
| 6,978,355 B2 | 12/2005 | Mowery et al. |
| 7,263,651 B2 | 8/2007 | Xia et al. |
| 7,428,617 B2 | 9/2008 | Okawa et al. |
| 7,800,856 B1 | 9/2010 | Bennett et al. |
| 8,599,510 B1 | 12/2013 | Fallone |
| 8,688,900 B2 | 4/2014 | Eleftheriou et al. |
| 9,081,706 B2 | 7/2015 | Koka |
| 9,129,628 B1 | 9/2015 | Fallone et al. |
| 9,182,915 B2 | 11/2015 | Sutardja |
| 9,323,688 B2 | 4/2016 | Sutardja |
| 9,454,991 B2 | 9/2016 | Sutardja |
| 9,477,611 B2 | 10/2016 | Sutardja |
| 9,559,722 B1 | 1/2017 | Huang et al. |
| 9,594,693 B2 | 3/2017 | Sutardja |
| 9,703,493 B2 | 7/2017 | Alavoine |
| 2003/0009640 A1 | 4/2003 | Arimilli et al. |
| 2004/0117587 A1 | 6/2004 | Arimilli et al. |
| 2004/0237022 A1 | 11/2004 | Karpuszka et al. |
| 2005/0166111 A1 | 7/2005 | Chien |
| 2005/0257119 A1 | 11/2005 | Blankenship et al. |
| 2006/0242534 A1 | 10/2006 | Livshitz |
| 2007/0022362 A1 | 1/2007 | Yue et al. |
| 2007/0162815 A1 | 7/2007 | El-Khamy et al. |
| 2007/0276976 A1 | 11/2007 | Gower et al. |
| 2008/0294867 A1 | 11/2008 | Kimura |
| 2009/0043965 A1 | 2/2009 | Kuttana et al. |
| 2009/0235014 A1 | 9/2009 | Yim |
| 2010/0185904 A1 | 7/2010 | Chen |
| 2011/0119538 A1 | 5/2011 | Ipek |
| 2011/0231565 A1 | 9/2011 | Gelter et al. |
| 2011/0307755 A1 | 12/2011 | Livshitz et al. |
| 2013/0019064 A1 | 1/2013 | Kumashikar et al. |
| 2013/0283126 A1 | 10/2013 | Ramaraju |
| 2013/0321948 A1 | 12/2013 | Bandic et al. |
| 2013/0335856 A1 | 12/2013 | Tanabe et al. |
| 2014/0164844 A1 | 6/2014 | Damodaran et al. |
| 2014/0181402 A1 | 6/2014 | White |
| 2014/0317356 A1 | 10/2014 | Srinivasan |
| 2015/0013025 A1 | 1/2015 | West |
| 2015/0058527 A1 | 2/2015 | Venkata |
| 2015/0074459 A1 | 3/2015 | Hong |
| 2015/0113214 A1 | 4/2015 | Sutardja |
| 2015/0113219 A1 | 4/2015 | Lai et al. |
| 2015/0242137 A1 | 8/2015 | Sutardja |
| 2015/0318022 A1 | 11/2015 | Sutardja |
| 2016/0026574 A1 | 1/2016 | Frank |
| 2016/0205044 A1 | 7/2016 | Tripathi et al. |
| 2016/0283399 A1 | 9/2016 | Das Sharma |
| 2016/0342514 A1 | 11/2016 | Wang |
| 2017/0177481 A1 | 6/2017 | Sutardja |
| 2017/0177488 A1* | 6/2017 | Leung ............... G06F 12/0804 |
| 2017/0344276 A1 | 11/2017 | Sutardja |
| 2018/0239708 A1 | 8/2018 | Conway |
| 2019/0042440 A1 | 2/2019 | Kumar et al. |
| 2019/0384709 A1 | 12/2019 | Sutardja |
| 2021/0133123 A1 | 5/2021 | Feehrer et al. |

FOREIGN PATENT DOCUMENTS

| | | |
|---|---|---|
| JP | 2013/504822 A | 2/2013 |
| SK | 10-2017-0065374 | 6/2017 |
| SK | 10-2017-0102723 | 9/2017 |
| SK | 10-2017-0122481 | 11/2017 |
| SK | 10-2021-0124082 | 10/2021 |
| WO | WO 96/37844 | 11/1996 |
| WO | WO 2008/055272 | 5/2008 |
| WO | WO 2011/031969 | 3/2011 |
| WO | 2013/095559 | 6/2013 |

OTHER PUBLICATIONS

U.S. Appl. No. 62/000,657, filed May 2014, Huang.
U.S. Appl. No. 62/013,700, filed Jun. 2014, Huang.
U.S. Appl. No. 62/013,706, filed Jun. 2014, Huang.
U.S. Appl. No. 14/681,485, filed Apr. 2015, Huang, et al.
U.S. Appl. No. 14/702,078, filed May 2015, Sutardja.
U.S. Appl. No. 14/706,335, filed May 2015, Huang, et al.
U.S. Appl. No. 14/710,988, filed May 2015, Sutardja.
IEE P802.11ac / D2.0; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802.11 Working Group of the 802 Committee; Jan. 2012; 359 pages.
"Specification of the Bluetooth System" Master Table of Contents & Compliance Requirements—Covered Core Package version: 4.0; Jun. 30, 2010; 2302 pages.
IEEE P802.11ad I D5.0 (Draft Amendment based on IEEE P802.11REVmb D10.0) (Amendment to IEEE 802.11REVmb D10.0 as amended by IEEE 802.11ae D5.0 and IEEE 802.11aa D6.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band; Sponsor IEEE 802.11 Committee of the IEEE Computer Society; Sep. 2011; 601 pages.
Rolf de Vegt; IEEE 802.11ax Selection Procedure (DRAFT); Jul. 2014; 117 pages.
International Search Report and Written Opinion for PCT Application No. PCT/US20141061603 mailed Jan. 12, 2015; 12 pages.
IEEE P802.11ac 1 MID5.0; Draft Standard for Information Technology—Telecommunications and information exchange between systems—Local and metropolitan area networks—Specific requirements: Part 11: Wireless LAN Medium Access Control (MAC) and Physical Layer (PHY) specifications: Amendment 4: Enhancements for Very High Throughput for Operation in Bands below 6 GHz; Jan. 2013; 440 pages.
IEEE Std. 802.11b; Supplement to IEEE Standard for Information technology—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 2009; 96 pages.
IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.

(56) References Cited

OTHER PUBLICATIONS 802.16-2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.

IEEE Std 802.20-2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29, 2008; 1032 pages.

IEEE P802.11ah I D1.0 (Amendment to IEEE Std 802.11REVmc I 01.1, IEEE Std 802.11acl D5.0 and IEEE Std 802.11af I D3.0) Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society ; Oct. 2013; 394 a es.

IEEE Std 802.11a-1999 (Supplement to IEEE Std 802.11-1999) Supplement to IEEE Standard for Information technology—Telecommunications and information exchange between systems—Local and metropolitan area networks—Specific requirements—Part11: Wireless LAN Medium Access. Control (MAC) and Physical Layer (PHY) specifications: High-Speed Physical Layer in the 5 GHZ Band; LAN/MAN Standards Committee of the IEEE Computer Society; Sep. 16, 1999; 91 a es.

IEEE P802.11g/D8.2 Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; Apr. 2003; 69 a es.

IEEE P802.11 Wireless LANs; Proposed Specification Framework for TGah; Mar. 2012; 13 Pa es.

EEE P802.20 1 M V14, Draft 802.20 Permanent Document; System Requirements for IEEE 802.20 Mobile Broadband Wireless Access Systems—Version 14>; Jul. 16, 2004; 24 a es.

Gunnam, Kiran, Choi, Gwan, Wang, Weihuang; Multi-Rate Layered Decoder Architecture for Block LDPC Codes of the IEEE 802.11n Wireless Standard; Department of Electrical and Computer Engineering; 2007; a es 1645-1648.

International Search Report and Written Opinion for PCT Application No. PCT/US2015/028867 mailed Jul. 13, 2015; 9 a es.

Taeho Kgil and Trevor Mudge; "FlashCache: A NAND Flash Memory File Cache for Low Power Web Servers"; Advanced Computer Architecture Laboratory; The University of Michigan, Ann Arbor, USA; Jan. 2006; 13 a es.

IEEE Std 802.11b-1999/ Cor Jan. 2001; IEEE Standard for Information Technology Telecommunications and information exchange between systems—Local and metropolitan area networks—Specific requirements; Part 11: Wireless LAN Medium Access Control (MAC) and Physical Layer (PHY) specifications; Amendment 2: Higher-Speed Physical Layer (PHY) extension in the 2.4 GHz Band—Corrigendum 1; IEEE Computer Society; Sponsored by the LAN/MAN Standards Committee; Nov. 7, 2001; 23 a es.

Sivaraman R., et al., FPGA based generic RO TRNG architecture for image confusion, Multimedia Tools and Application 79(19), pp. 13841-13868, https://link.springer.com/article/10.1007/s11042-019-08592, pp. 13842-13843, Feb. 3, 2020.

* cited by examiner

METHOD AND APPARATUS FOR USING A STORAGE SYSTEM AS MAIN MEMORY

1. FIELD OF THE INVENTION

The present disclosure relates to integrated circuits and computer systems, and more particularly to computer main memory.

2. BACKGROUND

Computing devices (servers, PC's, mobile phones, tablets, etc.). typically include a processor or system-on-chip (SoC). FIG. 1 shows an example of a device 10 that includes a processor or SoC 12 and main memory made of one or more dynamic random access memories (DRAMs) 14. The DRAMs 14 can be implemented as one or more integrated circuits that are connected to but separate from the SoC 12. The device 10 can also include one or more storage drives 16 connected to ports 17 of the SoC 12. The storage drives 16 can include flash memory, solid-state drives, hard disk drives, and/or hybrid drives. A hybrid drive includes a solid-state drive with solid-state memory and a hard disk drive with rotating storage media.

The SoC 12 can include one or more image processing devices 20, a system bus 22 and a memory controller 24. Each of the image processing devices 20 can include, for example: a control module 26 with a central processor (or central processing unit (CPU)) 28; a graphics processor (or graphics processing unit (GPU)) 30; a video recorder 32; a camera image signal processor (ISP) 34; an Ethernet interface such as a gigabit (Gb) Ethernet interface 36; a serial interface such as a universal serial bus (USB) interface 38 and a serial advanced technology attachment (SATA) interface 40; and a peripheral component interconnect express (PCIe) interface 42. The image processing devices 20 access the DRAMs 14 via the system bus 22 and the memory controller 24. The DRAMs 14 are used as main memory. For example, one of the image processing devices 20 provides a physical address to the memory controller 24 when accessing a corresponding physical location in one of the DRAMs 14. The image processing devices 20 can also access the storage drives 16 via the system bus 22.

The SoC 12 and/or the memory controller 24 can be connected to the DRAMs 14 via one or more access ports 44 of the SoC 12. The DRAMs 14 store user data, system data, and/or programs. The SoC 12 can execute the programs using first data to generate second data. The first data can be stored in the DRAMs 14 prior to the execution of the programs. The SoC 12 can store the second data in the DRAMs 14 during and/or subsequent to execution of the programs. The DRAMs 14 can have a high-bandwidth interface and low-cost-per-bit memory storage capacity and can handle a wide range of applications.

The SoC 12 includes cache memory, which can include one or more of a level zero (L0) cache, a level one (L1) cache, a level two (L2) cache, or a level three (L3) cache. The L0-L3 caches are arranged on the SoC 12 in close proximity to the corresponding ones of the image processing devices 20. In the example shown, the control module 26 includes the central processor 28 and L1-L3 caches 50. The central processor 28 includes a L0 cache 52. The central processor 28 also includes a memory management unit (MMU) 54, which can control access to the caches 50, 52.

As the level of cache increases, the access latency and the storage capacity of the cache increases. For example, L1 cache typically has less storage capacity than L2 cache and L3 cache. However, L1 cache typically has lower latency than L2 cache and L3 cache.

The caches within the SoC 12 are typically implemented as static random access memories (SRAMs). Because of the close proximity of the caches to the image processing devices 20, the caches can operate at the same clock frequencies as the image processing devices 20. Thus, caches exhibit shorter latency periods than the DRAMS 14.

The number and size of the caches in the SoC 12 depends upon the application. For example, an entry level handset (or mobile phone) may not include an L3 cache and can have smaller sized L1 cache and L2 cache than a personal computer. Similarly, the number and size of each of the DRAMs 14 depends on the application. For example, mobile phones currently have 4-12 gigabytes (GB) of DRAM, personal computers currently have 8-32 GB of DRAM, and servers currently have 32 GB-512 GB of DRAM. In general, cost increases with large amounts of main memory as the number of DRAM chips increases.

In addition to the cost of DRAM, it is becoming increasingly more difficult to decrease the package size of DRAM for the same amount of storage capacity. Also, as the size and number of DRAMs incorporated in a device increases, the capacitances of the DRAMs increase, the number and/or lengths of conductive elements associated with the DRAMs increases, and buffering associated with the DRAMs increases. In addition, as the capacitances of the DRAMs increase, the operating frequencies of the DRAM's decrease and the latency periods of the DRAMs increase.

During operation, programs and/or data are transferred from the DRAMs 14 to the caches in the SoC 12 as needed. These transfers have higher latency as compared to data exchanges between (i) the caches, and (ii) the corresponding processors and/or image processing devices. For this reason, accesses to the DRAMs 14 are minimized by building SOC's with larger L3 caches. Yet despite having larger and larger L3 caches, every year computing systems still need more and more DRAM's (larger main memory). With all else being equal, a computer with a larger main memory will have better performance than a computer with smaller main memory. With today's operating systems, a modern PC with a 4 GB main memory would in fact perform extremely poorly even if it is equipped with the fastest and best processor. The reason why computer main memory size keeps increasing over time is explained next.

During boot up, programs can be transferred from the storage drives 16 to the DRAMs 14. For example, the central processor 28 can transfer programs from the storage drive 16 to the DRAMs 14 during the boot up. Only when the programs are fully loaded to the DRAM's can central processor 28 executes the instructions stored in the DRAMs. If the CPU needs to run a program one at a time and the user is willing to wait while the CPU kills the previous program before launching a new program, the computer system would indeed require very small amount of main memory. However, this would be unacceptable to consumers which are now accustomed to instant response time when launching new programs and switching between programs on the fly. This is why every year computers always need more DRAMs and that establishes the priority of DRAM companies to manufacture larger DRAMs.

SUMMARY

To overcome the drawbacks of the prior art and provide additional benefits, a data storage and access system for use with a processor is disclosed. The processor is configured to generate a data request for data and the data request may include a physical address. In this embodiment an FLC cache system is used to virtualize the computer main memory so that main memory could now be made of much lower cost memory devices such as flash memory and computer could be built using much smaller capacity DRAMs than previously possible. The FLC system comprises a first FLC module having a first FLC controller and first memory, such that the first FLC module receives the data request from the processor. A second FLC module includes a second FLC controller and second memory. The first FLC module receives, responsive to the first FLC module not having the data requested by the processor, the data request from the first FLC module. A storage drive is provided and is configured with a user file storage portion/partition and a main memory portion/partition. The storage drive receives the data request when the second FLC module does not have the data requested by the first FLC module. By employing a two stage FLC system the first FLC module is now free to mostly serve the processor requests while the second FLC module is freed to move data in an out of the storage drive without impacting the performance of the first FLC module.

In one embodiment, the data request includes a physical address and first FLC controller includes a loop-up table configured to translate the physical address to a first virtual address if the first FLC controller contains the physical address entry. If the first FLC controller look-up table does not contain the physical address entry, then the first FLC controller is configured to forward the data request with the physical address to the second FLC controller. The terms physical address and physical address entry may be used interchangeable herein. The second FLC controller may include a loop-up table configured to translate the physical address to a second virtual address. Further, if the second FLC controller look-up table does not contain the physical address, the second FLC controller is configured to forward the data request with the physical address to the storage drive.

In one embodiment, the first FLC module is optimized for significantly faster access time, lower latency and lower power consumption than the second FLC module at the expense of higher cost on per bit basis than that of traditional DRAM main memory. However, because the first FLC module memory capacity is much smaller than the second FLC module the cost increase is practically negligible and, more importantly, significant cost saving has already been achieved by moving the main memory into a storage drive. In one configuration, the first memory is a custom-made DRAM and includes a first memory controller and the second memory is made of off the shelf commodity DRAMs and includes a second memory controller. The storage drive preferably uses reasonably fast solid state memory since the actual main memory is physically now in the storage drive. Any misses to the second FLC module would be thousand times slower than traditional main memory accesses when using DRAMs and its impact has to be minimized. This is the reason why FLC fully associative and large cache line technology is proposed and is fundamental to keep the miss rates to be negligible. The first FLC module and the second FLC module may additionally be configured to perform predictive fetching of data stored at addresses expected to be accessed in the future. Moreover, FLC modules may also be configured to take hints (instructions) from the processor or software to perform prefetching of data into first FLC module and/or second FLC module from the final main memory that now resides in the storage drive. In one embodiment, the software executing on the processing device may know what data (including code) is next require and may provide an instruction to the FLC system to pre-fetch that data into the DRAM cache so that needed data is there when needed. It may be cached in the standard speed FLC or the high speed FLC. IN one embodiment, thousands of cache lines are prefetched. Accurate pre-fetching may lead to a 100% hit rate.

Also disclosed herein is a method of operating a data access system. In this embodiment, the data access system comprises a processor having processor cache, a storage drive, a first FLC module which includes a first FLC controller and a first DRAM and a second FLC module which includes a second FLC controller and a second DRAM. This method includes generating, with the processor, a request for data which includes a physical address, and providing the request for data to the first FLC module. With the first FLC module, determining if the first FLC controller contains the physical address entry and responsive to the first FLC controller containing the physical address entry, retrieving the data from the first DRAM and providing the data to the processor. Alternatively, responsive to the first FLC controller not containing the physical address entry, forwarding the request for data and the physical address to the second FLC module. At the second FLC module, determining if the second FLC controller contains the physical address entry, and responsive to the second FLC controller containing the physical address entry, retrieving the data (in the form of a complete cache line entry related to the requested data) from the second DRAM and providing the requested cache line data (data stored in a cache line) to the first FLC module.

This method may further comprise responsive to the second FLC controller not containing the physical address, forwarding the request for data (in the form of a cache line corresponding to the requested data) and the physical address to the storage drive. This method may also include the storage drive retrieving the data from a portion of the storage drive reserved as additional main memory, and then providing the data (cache line) to the second FLC module. In addition, responsive to the first FLC controller containing the physical address and the providing of the data to the processor, the FLC controller updates a status register reflecting the recent use of a cache line containing the data.

In one embodiment, retrieving the data from the second DRAM and providing the data to the first FLC module further comprises storing the physical address in the first FLC controller and storing the data in the first DRAM. If the first DRAM does not have available free space, then removing least recently used data from the first DRAM and the first FLC address look up entry table to make space for the new data. In yet another embodiment, FLC modules may proactively make a portion of the DRAMs available for future processor requests. The first FLC module may also proactively make a portion of its DRAMs to be clean so that, on demand, it could erase the entries stored at the cache lines to be cleaned to make room for new entries for new processor requests. This is done by writing back dirty cache lines to the second FLC module. Upon hints (pre-fetch requests) from the operating system programs/data that no longer needed could furthermore be erased from the FLC DRAM's. This saves time and power. It furthermore prevents accidental writes to SSD whenever a no longer used program/data is purged to the SSD. In one embodiment, the second stage DRAM (referred to herein as DRAM-SS) is about eight times larger than the first stage DRAM. In one embodiment a portion of the second stage DRAM is proactively maintained as clean (emptied) to make room for all or a portion of the first stage DRAM being moved to the second stage DRAM. In one embodiment, at least ten percent of the second stage DRAM is maintained as clean or on demand cleaned for prefetching of data or for first stage DRAM contents to be moved to the second stage. In one embodiment, at least half of the size of the first stage DRAM is maintained as empty or cleanable in the second stage DRAM. In one embodiment, the second stage DRAM is at least four times larger than the first stage DRAM. In one embodiment, the second stage DRAM is at least eight times larger than the first stage DRAM. In one embodiment, the second stage DRAM is at least sixteen times larger than the first stage DRAM.

Also disclosed herein is a data storage and access system having several elements include a processor having processor cache. The processor is configured to generate a first data request for first data. Also part of this system is a first FLC cache system that communicates with the processor. The first FLC cache system is configured to function as a super-fast main memory cache (faster than the second FLC cache system), with an extremely high hit rates (99.9%), receives the first data request for the first data. In one embodiment the first FLC cache (HS) is at least two times as fast the second FLC cache (SS). In one embodiment the first FLC cache (HS) is at least four times as fast the second FLC cache (SS). The first FLC cache system is also designed for keeping track of tens of thousands of independent threads that would be needed by the processor. A second FLC cache system is provided, and it communicates to the first FLC and is configured to function as a secondary (backup) main memory cache for the first FLC and receive the second data request for the second data. A storage drive is configured with a user file storage partition and a main memory partition such that the main memory partition of the storage drive functions as the actual main memory. Alternatively, a separate and dedicated storage drive maybe used as the actual main memory. Furthermore, preferably the main memory partition of the storage drive is configured for high reliability. For Nand flash based storage drive the main memory partition is preferably configured with Single Level Cells (SLC) instead of the traditional Triple or Quad Level Cells (TLC/QLC).

This system may further comprise a system bus where the processor communicates with multiple slices of independent FLC cache modules over the system bus. In one configuration, if the first data requested by the processor is not contained in the first slice FLC cache system, then the first data request is sent to the storage drive to retrieve the first data from the main memory partition of the storage drive, and if yet a different first data requested by the processor is not contained in the second slice FLC cache system, then the first data request is sent to the storage drive to retrieve the first data from the main memory partition of the storage drive. It is contemplated that the first slice FLC cache system may comprise of a first stage FLC module and a second stage FLC module, and the second slice FLC cache system may comprise of a first stage FLC module and a second stage FLC module. In addition, each of the FLC modules should include a dedicated FLC controller, address look up tables, and memory.

Further areas of applicability of the present disclosure will become apparent from the detailed description, the claims and the drawings. The detailed description and specific examples are intended for purposes of illustration only and are not intended to limit the scope of the disclosure.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF DRAWINGS

The components in the figures are not necessarily to scale, emphasis instead being placed upon illustrating the principles of the invention. In the figures, like reference numerals designate corresponding parts throughout the different views.

In the drawings, reference numbers may be reused to identify similar and/or identical elements.

DESCRIPTION

At least some of the following examples include final level cache (FLC) modules and storage drives. The FLC modules are used as main memory cache and the storage drives are used as physical storage for user files and also a portion of the storage drive is partitioned for use by the FLC modules as the actual main memory. This is in contrast of traditional computers where the actual main memory is made of DRAMs. Data is first attempted to be read from or written to the DRAM of the FLC modules with the main memory portion of the physical storage drive providing the last resort back up in the event of misses from FLC modules. Look up tables in the FLC modules are referred to herein as content addressable memory (CAM). FLC controllers of the FLC modules control access to the memory in the FLC modules and the storage drives using various CAM techniques described below. The CAM techniques and other disclosed features reduce the required storage capability of the DRAM in a device while maximizing memory access rates and minimizing power consumption. The device may be a mobile computing device, desktop computers, server, network device or a wireless network device. Examples of devices include but are not limited to a computer, a mobile phone, a tablet, a camera, etc. The DRAM in the following examples is generally not used as main memory, but rather is used as caches of the much slower main memory that is now located in a portion the storage drive. Thus, the partition of the storage drive is the main memory and the DRAM is cache of the main memory.

Figure 1:
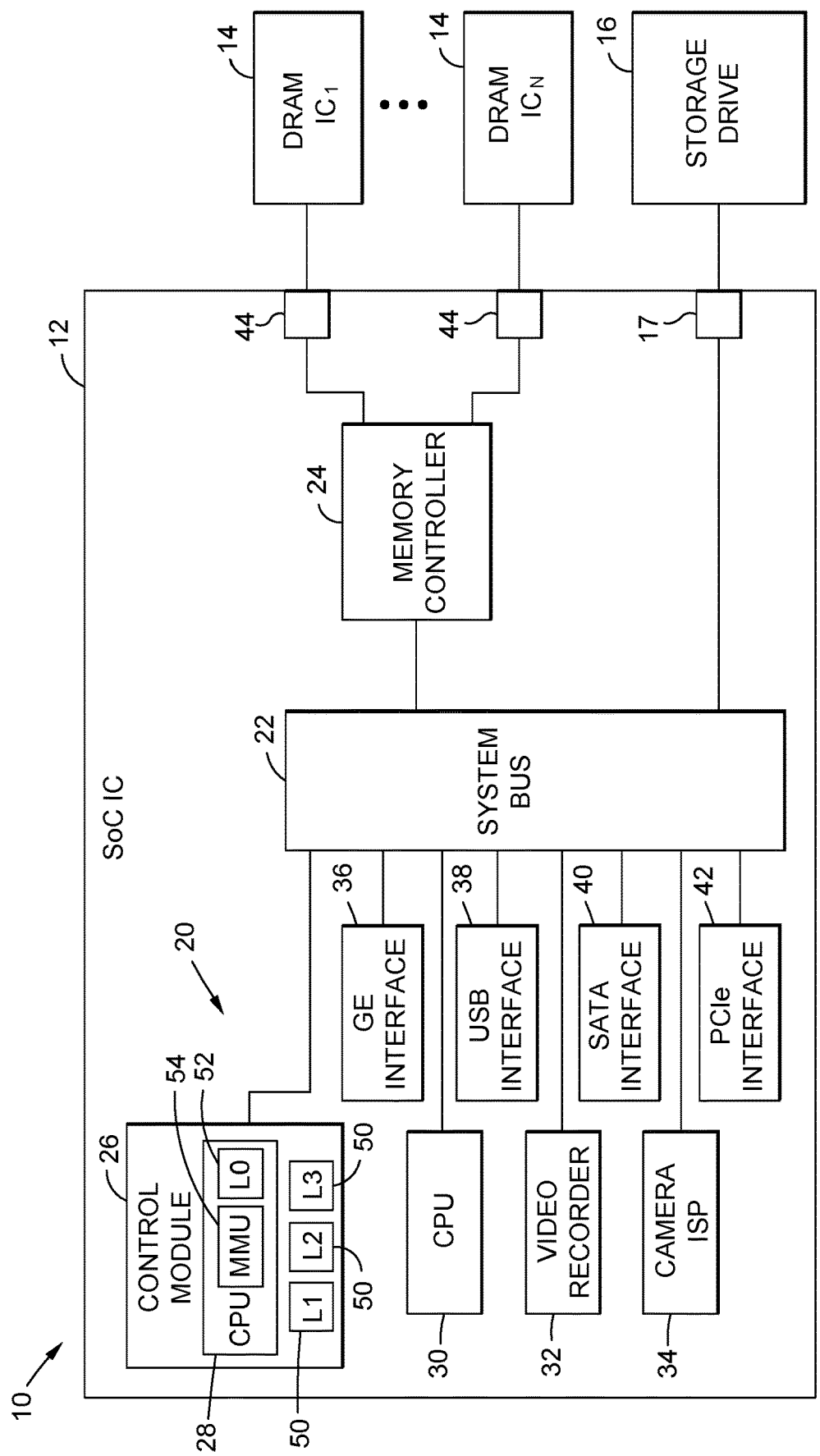
FIG. 1 is a functional block diagram of a device according to the prior art.
Figure 2:
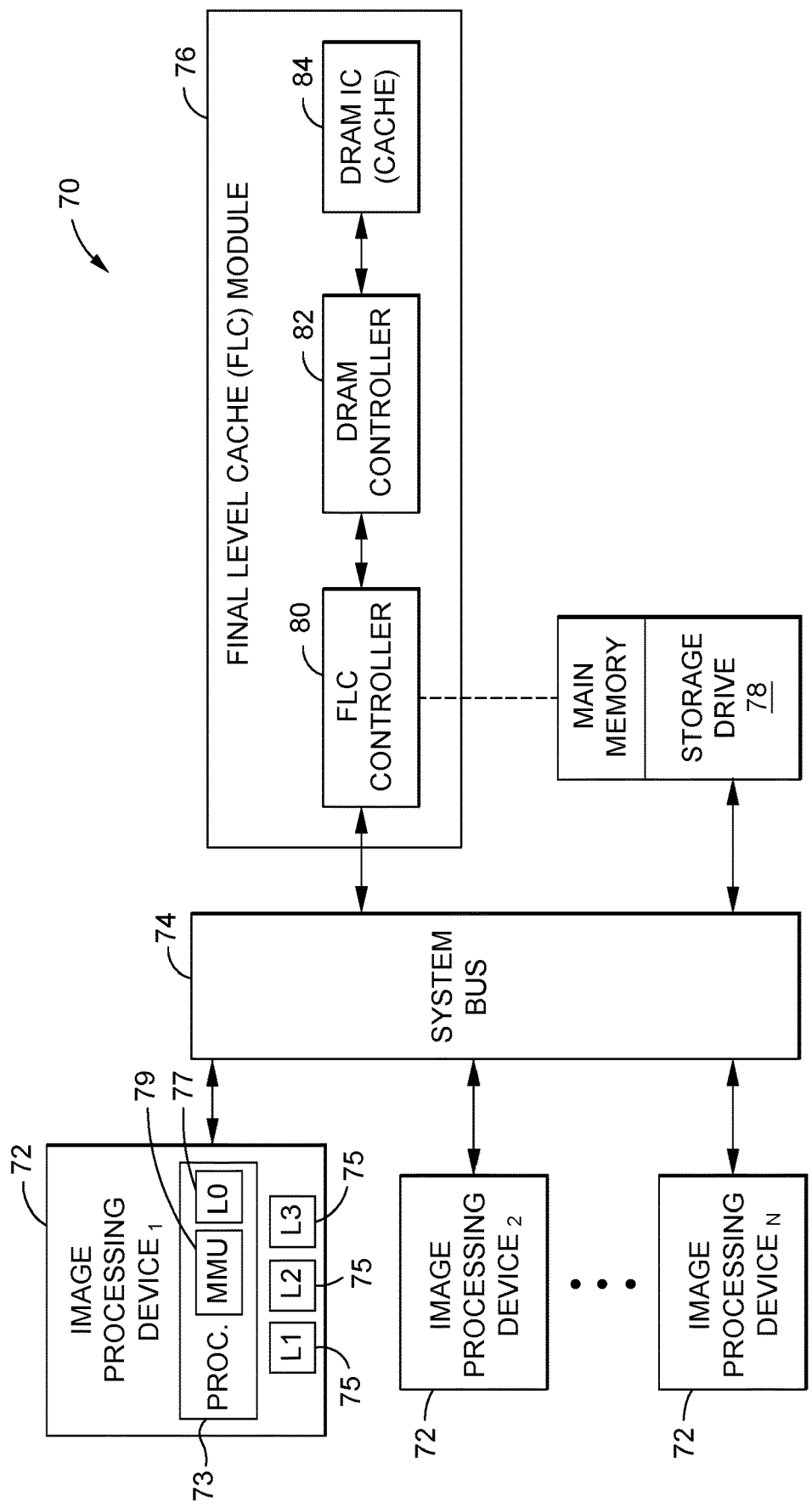
FIG. 2 is a functional block diagram of a data access system in accordance with an embodiment of the present disclosure.

FIG. 2 shows a data access system 70 that includes processing devices 72, a system bus 74, a FLC module 76, and a storage drive 78. The data access system 70 may be implemented in, for example, a computer, a mobile phone, a tablet, a server and/or other device. The processing devices 72 may include, for example: a central processor (or central processing unit (CPU)); a graphics processor (or graphics processing unit (GPU)); a video recorder; a camera signal processor (ISP); an Ethernet interface such as a gigabit (Gb) Ethernet interface; a serial interface such as a universal serial bus (USB) interface and a serial advanced technology attachment (SATA) interface; and a peripheral component interconnect express (PCIe) interface; and/or other image processing devices. The processing devices 72 may be implemented in one or more modules. As an example, a first one of the processing modules 72 is shown as including cache memory, such as one or more of a level zero (L0) cache, a level one (L1) cache, a level two (L2) cache, or a level three (L3) cache. In the example shown, the first processing device may include a central processor 73 and L1-L3 caches 75. The central processor 73 may include a L0 cache 77. The central processor 73 may also include a memory management unit (MMU) 79 which can control access to the processor caches 75, 77. The MMU 79 may also be considered a memory address translator for the processor caches. The MMU is responsible for translating CPU virtual address to system physical address. Most modern CPUs use physical address caches, meaning L0/L1/L2/L3 caches are physically addressed. Cache misses from CPU also goes out to the system bus using physical address.

Tasks described below as being performed by a processing device may be performed by, for example, the central processor 73 and/or the MMU 79.

The processing devices 72 are connected to the FLC module 76 via the system bus 74. The processing devices 72 are connected to the storage drive 78 via the bus and interfaces (i) between the processing devices 72 and the system bus 74, and (ii) between the system bus 74 and the storage drive 78. The interfaces may include, for example, Ethernet interfaces, serial interfaces, PCIe interfaces and/or embedded multi-media controller (eMMC) interfaces. The storage drive 78 may be located anywhere in the world away from the processing devices 72 and/or the FLC controller 80. The storage drive 78 may be in communication with the processing devices 72 and/or the FLC controller 80 via one or more networks (e.g., a WLAN, an Internet network, or a remote storage network (or cloud)).

The FLC module 76 includes a FLC controller 80, a DRAM controller 82, and a DRAM IC 84. The terms DRAM IC and DRAM are used interchangeable. Although referenced for understanding as DRAM, other types of memory could be used include any type RAM, SRAM, DRAM, or any other memory that performs as described herein but with a different name. The DRAM IC 84 is used predominately as virtual and temporary storage while the storage drive 78 is used as physical and permanent storage. This implies that generally a location in the DRAM IC has no static/fixed relationship to the physical address that is generated by the processor module. The storage drive 78 may include a partition that is reserved for use as main memory while the remaining portion of the storage drive is used as traditional storage drive space to store user files. This is different than prior art demand paging operations that would occur when the computer is out of physical main memory space in the DRAM. In that case, large blocks of data/programs from DRAM are transferred into and from the hard disk drive. This also entails deallocating and reallocating physical address assignments which is done by the MMU and the Operating System, which is a slow process as operating system (OS) does not have sufficient nor it has precise information on the relative importance of the data/programs that are stored in the main memory. The processing devices 72 address the DRAM IC 84 and the main memory partition of the storage drive 78 as if they were a single main memory device. A user does not have access to and cannot view data or files stored in the main memory partition of the storage drive, in the same way that a user can not see the files stored in RAM during computer operation. While reading and/or writing data, the processing devices 72 sends access requests to the FLC controller 80. The FLC controller 80 accesses the DRAM IC 84 via the DRAM controller 82 and/or accesses the storage drive 78. The FLC controller 80 may access the storage drive directly (as indicated by dashed line) or via the system bus 74. From processor and programmer point of view, accesses to the storage partition dedicated as main memory are done through processor native load and store operations and not as I/O operations.

Various examples of the data access system 70 are described herein. In a first example, the FLC module 76 is implemented in a SoC separate from the processing devices 72, the system bus 74 and the storage drive 78. In another embodiment, the elements are on different integrated circuits. In a second example, one of the processing devices 72 is a CPU implemented processing device. The one of the processing devices 72 may be implemented in a SoC separate from the FLC module 76 and the storage drive 78. As another example, the processing devices 72 and the system bus 74 are implemented in a SoC separate from the FLC module 76 and the storage drive 78. In another example, the processing devices 72, the system bus 74 and the FLC module 76 are implemented in a SoC separate from the storage drive 78. Other examples of the data access system 70 are disclosed below.

The DRAM IC 84 may be used as a final level of cache. The DRAM IC 84 may have various storage capacities. For example, the DRAM IC 84 may have 1-2 GB of storage capacity for mobile phone applications, 4-8 GB of storage capacity for personal computer applications, and 16-64 GB of storage capacity for server applications.

The storage drive 78 may include NAND flash SSD or other non-volatile memory such as Resistive RAM and Phase Change Memory. The storage drive 78 may have more storage capacity than the DRAM IC 84. For example, the storage drive 78 may include 8-16 times more storage than the DRAM IC 84. The DRAM IC 84 may include high-speed DRAM and the storage drive 78 may, even in the future, be made of ultra-low cost and low-speed DRAM if low task latency switching time is important. Ultimately a new class of high capacity serial/sequential large-page DRAM (with limited random accessibility) could be built for the final main memory. Such a serial DRAM device could be at least two times more cost effective than traditional DRAM as die size could be at least two times smaller than traditional DRAM. In one embodiment, the serial DRAM would have a minimum block (chunk) size which could be retrieved or written at a time, such as one cache line (4 KB) but other embodiment a minimum block sizes could be established. Thus, data not be read or written to any location, but instead only to/from certain block. Such serial DRAM could furthermore be packaged with an ultra-high speed serial interface to enable high capacity DRAM to be mounted far away from the processor devices which would enable processors to run at their full potential without worrying about overheating. As shown, a portion of the storage drive 78 is partitioned to serve as main memory and thus is utilized by the FLC controller 80 as an extension of the FLC DRAM 84.

The cache line stored in the DRAM IC 84 may be data that is accessed most recently, most often, and/or has the highest associated priority level. The cache line stored in the DRAM IC 84 may include cache line that is locked in. Cache line that is locked in refers to data that is always kept in the DRAM IC 84. Locked in cache line cannot be kicked out by other cache lines even if the locked in cache line has not been accessed for a long period of time. Locked in cache line however may be updated (written). In one embodiment defective DRAM cells (and its corresponding cache line) may be locked out (mapped out) from the FLC system by removing a DRAM address entry that has defective cell(s) to prevent the FLC address look up engine from assigning a cache line entry to that defective DRAM location. The defective DRAM entries are normally found during device manufacturing. Yet in another embodiment, the operating system may use the map out function to place a portion of DRAM into a temporary state where it is unusable by the processor for normal operations. Such function allows the operating system to issue commands to check the health of the mapped out DRAM section one section at a time while the system is running actual applications. If a section of the DRAM is found with weak cells operating system may then proactively disable the cache line that contains the weak cell(s) and bring the so called "weak cache line" out of service. In one embodiment FLC engine could include hardware diagnostic functions to off load the processor from performing DRAM diagnostics in software.

In some example embodiments, the data stored in the DRAM IC 84 does not include software applications, fonts, software code, alternate code and data to support different spoken languages, etc., that are not frequently used (e.g., accessed more than a predetermined number of times over a predetermined period of time). This can aid in minimizing size requirements of the DRAM IC 84. Software code that is used very infrequently or never at all could be considered as "garbage code" as far as FLC is concerned and they may not be loaded by FLC during the boot up process and if they did get loaded and used only once for example to be purged by FLC and never loaded anymore in the future thus freeing up the space of the DRAM IC 84 for truly useful data/programs. As the size of the DRAM IC 84 decreases, DRAM performance increases and power consumption, capacitance and buffering decrease. As capacitance and buffering decrease, latencies decrease. Also, by consuming less power, the battery life of a corresponding device is increased. Overall system performance of course would increase with bigger DRAM IC 84 but that comes at the expense of increase of cost and power.

The FLC controller 80 performs CAM techniques in response to receiving requests from the processing devices 72. The CAM techniques include converting first physical address of the requests provided by the processing devices 72 to virtual addresses. These virtual addresses are independent of and different than virtual addresses originally generated by the processing devices 72 and mapped to the first physical addresses by the processing devices 72. The DRAM controller 82 converts (or maps) the virtual addresses generated by the FLC controller 80 to DRAM addresses. If the DRAM addresses are not in the DRAM IC 84, the FLC controller 80 may (i) fetch the data from the storage drive 78, or (ii) may indicate to (or signal) the corresponding one of the processing devices 72 that a cache miss has occurred. Fetching the data from the storage drive 78 may include mapping the first physical addresses received by the FLC controller 80 to a second physical addresses to access the data in the storage drive 78. A cache miss may be detected by the FLC controller 80 while translating a physical address to a virtual address.

FLC controller 80 may then signal one of the processing devices 72 of the cache miss as it accesses the storage drive 78 for the data. This may include accessing the data in the storage drive 78 based on the first (original) physical addresses through mapping of the first/original physical address to a storage address and then accessing the storage drive 78 based on the mapped storage addresses.

CAM techniques are used to map first physical address to virtual address in the FLC controller. The CAM techniques provide fully associative address translation. This may include logically comparing the processor physical addresses to all virtual address entries stored in a directory of the FLC controller 80. Set associative address translation should be avoided as it would result in much higher miss rates which in return would reduce processor performance. A hit rate of data being located in the DRAM IC 84 with a fully associative and large cache line architecture (FLC) after initial boot up may be as high as 99.9% depending on the size of the DRAM IC 84. The DRAM IC 84 in general should be sized to assure a near 100% medium term (minutes of time) average hit rate with minimal idle time of a processor and/or processing device. For example, this may be accomplished using a 1-2 GB DRAM IC for mobile phone applications, 4-8 GB DRAM ICs for personal computer applications, and 16-64 GB DRAM ICs for server applications.

Figure 3:
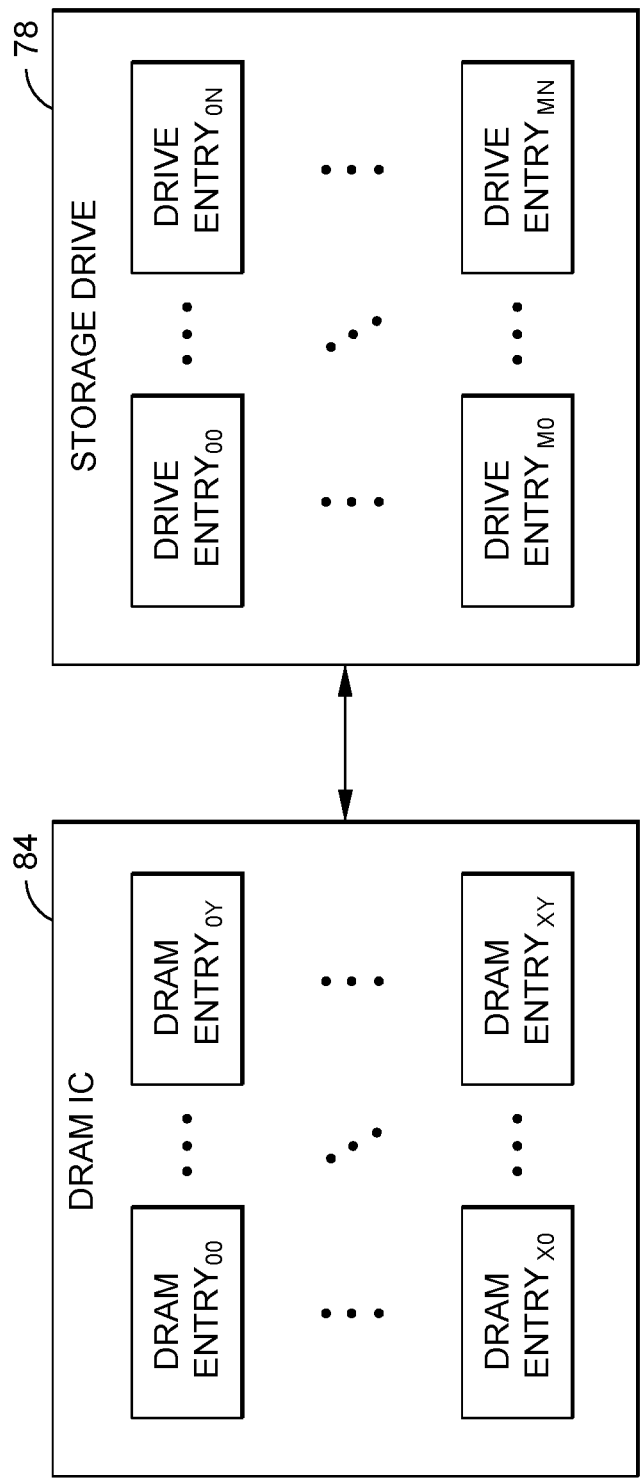
FIG. 3 is a functional block diagram illustrating entries of a DRAM and a storage drive of the data access system of FIG. 2.

FIG. 3 shows entries of the DRAM IC 84 and the storage drive 78 of the data access system 70. The DRAM IC 84 may include DRAM entries$_{00\text{-}XY}$. The storage drive 78 may have drive entries$_{00\text{-}MN}$. Addresses of each of the DRAM entries$_{00\text{-}XY}$ may be mapped to one or more addresses of the drive entries$_{00\text{-}MN}$. However, since the size of DRAM is smaller than the size of storage device only a fraction of the storage device could at any given time be mapped to the DRAM entries. Portion of the DRAM could also be used for non-cacheable data as well as for storing a complete address lookup table of the FLC controller if non-collision free lookup process is used instead of a true CAM process. The data stored in the DRAM entries$_{00\text{-}XY}$ may include other metadata.

Each of the DRAM entries$_{00\text{-}XY}$ may have, for example, 4 KB of storage capacity. Each of the drive entries$_{00\text{-}MN}$ may also have 4 KB of storage granularity. If data is to be read from or written to one of the DRAM entries$_{00\text{-}XY}$ and the one of the DRAM entries$_{00\text{-}XY}$ is full and/or does not have all of the data associated with a request, a corresponding one of the drive entries$_{00\text{-}MN}$ is accessed. Thus, the DRAM IC 84 and the storage drive 78 are divided up into memory blocks of 4 KB. Each block of memory in the DRAM IC 84 may have a respective one or more blocks of memory in the storage drive 78. This mapping and division of memory may be transparent to the processing devices 72 of FIG. 2.

During operation, one of the processing devices 72 may generate a request signal for a block of data (or portion of it). If a block of data is not located in the DRAM IC 84, the FLC controller 80 may access the block of data in the storage drive 78. While the FLC controller 80 is accessing the data from the storage drive 78, the FLC controller 80 may send an alert signal (such as a bus error signal) back to the processing device that requested the data. The alert signal may indicate that the FLC controller 80 is in the process of accessing the data from a slow storage device and as a result the system bus 74 is not ready for transfer of the data to the processing device 72 for some time. If bus error signal is used, the transmission of the bus error signal may be referred to as a "bus abort" from the FLC module 76 to the processing device and/or SoC of the processing device 72. The processing device 72 may then perform other tasks while waiting for the FLC storage transaction to be ready. The other processor tasks then may proceed to continue by using data already stored in, for example, one or more caches (e.g., L0-L3 caches) in the SoC of the processing device and other data already stored in FLC DRAM. This also minimizes idle time of a processor and/or processing device.

If sequential access is performed, the FLC controller 80 and/or the DRAM controller 82 may perform predictive fetching of data stored at addresses expected to be accessed in the future. This may occur during a boot up and/or subsequent to the boot up. The FLC controller 80 and/or the DRAM controller 82 may: track data and/or software usage; evaluate upcoming lines of code to be executed; track memory access patterns; and based on this information predict next addresses of data expected to be accessed. The next addresses may be addresses of the DRAM IC 84 and/or the storage drive 78. As an example, the FLC controller 80 and/or the DRAM controller 82, independent of and/or without previously receiving a request for data, may access the data stored in the storage drive 78 and transfer the data to the DRAM IC 84.

The above-described examples may be implemented via servers in a network (may be referred to as a "cloud"). Each of the servers may include a FLC module (e.g., the FLC module 76) and communicate with each other. The servers may share DRAM and/or memory stored in the DRAM ICs and the storage drives. Each of the servers may access the DRAMs and/or storage drives in other servers via the network. Each of the FLC modules may operate similar to the FLC module of FIG. 2 but may also access DRAM and/or memory in each of the other servers via the cloud. Signals transmitted between the servers and the cloud may be encrypted prior to transmission and decrypted upon arrival at the server and/or network device of the cloud. The servers may also share and/or access memory in the cloud. As an example, a virtual address generated by a FLC controller of one of the servers may correspond to a physical address in: a DRAM of the FLC module of the FLC controller; a storage drive of the one of the servers; a DRAM of a FLC module of one of the other servers; a storage drive of one of the other servers; or a storage device of the cloud. The FLC controller and/or a processing device of the one of the servers may access the DRAM and/or memory in the other FLC modules, storage drives, and/or storage devices if a cache miss occurs. In short, the storage device could be in the cloud or network accessible. This reduces the size and cost of a computing device if a cloud located storage drive is utilized and as a result the computing device does not need a storage drive. While having the storage drive in the cloud or network accessible may be slower than having the storage drive co-located with the DRAM cache and processor, it allows the storage drive to be shared among several different processing devices and DRAM cache. In one example environment, a automobile may have numerous processors arranged around the vehicle and each may be configured with a DRAM cache system. Instead of each processor also having a SSD drive, a single SSD drive may be shared between all of the processing devices. With the very high hit rates disclosed herein, the SSD drive would rarely be accessed. Such an arrangement has the benefit of lower cost, small overall size, and easier maintenance.

The above-described examples may also be implemented in a data access system including: a multi-chip module having multiple chips; a switch; and a primary chip having a primary FLC module. The multi-chip module is connected to the primary chip module via the switch. Each of the FLC modules may operate similar to the FLC module of FIG. 2 but may also access DRAM and/or memory in each of the other chips via the switch. As an example, a virtual address generated by a FLC controller of one of the chips may correspond to a physical address in: a DRAM of the FLC module of the FLC controller; a storage drive of the one of the chips; a DRAM of a FLC module of one of the other chips; a storage drive of one of the other chips; or a storage device of the cloud. The FLC controller and/or a processing device of the one of the chips may access the DRAM and/or memory in the other FLC modules, storage drives, and/or storage devices if a cache miss occurs.

As an example, each of the secondary DRAMs in the multi-chip module and the primary DRAM in the primary chip may have 1 GB of storage capacity. A storage drive in the primary chip may have, for example, 64 GB of storage capacity. As another example, the data access system may be used in an automotive vehicle. The primary chip may be, for example, a central controller, a module, a processor, an engine control module, a transmission control module, and/or a hybrid control module. The primary chip may be used to control corresponding aspects of related systems, such as a throttle position, spark timing, fuel timing, transitions between transmission gears, etc. The secondary chips in the multi-chip module may each be associated with a particular vehicle system, such as a lighting system, an entertainment system, an air-conditioning system, an exhaust system, a navigation system, an audio system, a video system, a braking system, a steering system, etc. and used to control aspects of the corresponding systems.

As yet another example, the above-described examples may also be implemented in a data access system that includes a host (or SoC) and a hybrid drive. The host may include a central processor or other processing device and communicate with the hybrid drive via an interface. The interface may be, for example, a GE interface, a USB interface, a SATA interface, a PCIe interface, or other suitable interfaces. The hybrid drive includes a first storage drive and a second storage drive. The first storage drive includes an FLC module (e.g., the FLC module 76 of FIG. 2). A FLC controller of the FLC module performs CAM techniques when determining whether to read data from and/or write data to DRAM of the FLC module and the second storage drive.

As a further example, the above-described examples may also be implemented in a storage system that includes a SoC, a first high speed DRAM cache (faster than the second DRAM cache), a second larger DRAM cache (larger than the first DRAM cache), and a non-volatile memory (storage drive). The SoC is separate from the first DRAM, the second DRAM and the non-volatile memory. The first DRAM may store high-priority and/or frequently accessed data. A high-percentage of data access requests may be directed to data stored in the first DRAM. As an example, 99% or more of the data access requests may be directed to data stored in the first DRAM and the remaining 0.9% or less of the data access requests may be directed to data stored in the second DRAM, and less than 0.1% of data to the non-volatile memory (main memory partition in the storage drive). Low-priority and/or less frequently accessed data may be stored in the second DRAM and/or the non-volatile memory. As an example, a user may have multiple web browsers open which are stored in the first DRAM (high speed DRAM). The second DRAM on the other hand has a much higher capacity to store the numerous number of idle applications (such as idle web browser tabs) or applications that have low duty cycle operation. The second DRAM should therefore be optimized for low cost by using commodity DRAM and as such it would only have commodity DRAM performance it would also exhibit longer latency than the first DRAM. Contents for the truly old applications that would not fit in the second DRAM would then be stored in the non-volatile memory. Moreover, only dirty cache line contents of first and/or second DRAM could be written to the non-volatile memory prior deep hibernation. Upon wakeup from deep hibernation, only the immediately needed contents would be brought back to second and first FLC DRAM caches. As a result, wakeup time from deep hibernation could be orders of magnitude faster than computers using traditional DRAM main memory solution.

The SoC may include one or more control modules, an interface module, a cache (or FLC) module, and a graphics module. The cache module may operate similar to the FLC module of FIG. 2. The control modules are connected to the cache module via the interface module. The cache module is configured to access the first DRAM, the second DRAM and the non-volatile memory based on respective hierarchical levels. Each of the control modules may include respective L1, L2, and L3 caches. Each of the control modules may also include one or more additional caches, such as L4 cache or other higher-level cache. Many signal lines (or conductive elements) may exist between the SoC and the first DRAM. This allows for quick parallel and/or serial transfer of data between the SoC and the first DRAM. Data transfer between the SoC and the first DRAM is quicker than data transfer (i) between the SoC and the second DRAM, and (ii) between the SoC and the non-volatile memory.

The first DRAM may have a first portion with a same or higher hierarchical level than the L3 cache, the L4 cache, and/or the highest-level cache. A second portion of the first DRAM may have a same or lower hierarchical level than the second DRAM and/or the non-volatile memory. The second DRAM may have a higher hierarchical level than the first DRAM. The non-volatile memory may have a same or higher hierarchical level than the second DRAM. The control modules may change hierarchical levels of portions or all of each of the first DRAM, the second DRAM, and/or the non-volatile memory based on, for example, caching needs.

The control modules, a graphics module connected to the interface module, and/or other devices (internal or external to the SoC) connected to the interface module may send request signals to the cache module to store and/or access data in the first DRAM, the second DRAM, and/or the non-volatile memory. The cache module may control access to the first DRAM, the second DRAM, and the non-volatile memory. As an example, the control modules, the graphics module, and/or other devices connected to the interface module may be unaware of the number and/or size of DRAMs that are connected to the SoC.

The cache module may convert the first processor physical addresses and/or requests received from the control modules, the graphics module, and/or other devices connected to the interface module to virtual addresses of the first DRAM and the second DRAM, and/or storage addresses of the non-volatile memory. The cache module may store one or more lookup tables (e.g., fully set associative lookup tables) for the conversion of the first processor physical addresses to the virtual addresses of the first and second DRAM's and/or conversion of the first processor physical addresses to storage addresses. As a result, the cache module and one or more of the first DRAM, the second DRAM, and the non-volatile memory (main memory partition of the storage drive) may operate as a single memory (main memory) relative to the control modules, the graphics module, and/or other devices connected to the interface module. The graphics module may control output of video data from the control modules and/or the SoC to a display and/or the other video device.

The control modules may swap (or transfer) data, data sets, programs, and/or portions thereof between (i) the cache module, and (ii) the L1 cache, L2 cache, and L3 cache. The cache module may swap (or transfer) data, data sets, programs and/or portions thereof between two or more of the first DRAM, the second DRAM and the non-volatile memory. This may be performed independent of the control modules and/or without receiving control signals from the control modules to perform the transfer. The storage location of data, data sets, programs and/or portions thereof in one or more of the first DRAM, the second DRAM and the non-volatile memory may be based on the corresponding priority levels, frequency of use, frequency of access, and/or other parameters associated with the data, data sets, programs and/or portions thereof. The transferring of data, data sets, programs and/or portions thereof may include transferring blocks of data. Each of the blocks of data may have a predetermined size. As an example, a swap of data from the second DRAM to the first DRAM may include multiple transfer events, where each transfer event includes transferring a block of data (e.g., 4 KB of data).

For best performance the cache module of the first DRAM must be fully associative with large cache line sizes (FLC cache solution). However, for applications that could tolerate much higher miss rates, a set associative architecture could alternatively be used only for the first level DRAM cache. But even that it would still have large cache line sizes to reduce the number of cache controller entry tables. As for the second level DRAM cache fully associative and large cache line cache are used as anything else may shorten the life of the non-volatile main memory.

The first DRAM may have a first predetermined amount of storage capacity (e.g., 0.25 GB, 0.5 GB, 1 GB, 4 GB or 8 GB). A 0.5 GB first DRAM is 512 times larger than a typical L2 cache. The second DRAM may have a second predetermined amount of storage capacity (e.g., 2-8 GB or more for non-server based systems or 16-64 GB or more server based systems). The non-volatile memory may have a third predetermined amount of storage capacity (e.g., 16-256 GB or more). The non-volatile memory may include solid-state memory, such as flash memory or magneto-resistive random access memory (MRAM), and/or rotating magnetic media. The non-volatile memory may include a SSD and a HDD. Although the storage system has the second DRAM and the non-volatile memory (main memory partition of the storage drive), either of the second DRAM and the non-volatile memory may not be included in the storage system.

As a further example, the above-described examples may also be implemented in a storage system that includes a SoC and a DRAM IC. The SoC may include multiple control modules (or processors) that access the DRAM IC via a ring bus. The ring bus may be a bi-directional bus that minimizes access latencies. If cost is more important than performance, the ring bus may be a unidirectional bus. Intermediary devices may be located between the control modules and the ring bus and/or between the ring bus and the DRAM IC. For example, the above-described cache module may be located between the control modules and the ring bus or between the ring bus and the DRAM IC.

The control modules may share the DRAM IC and/or have designated portions of the DRAM IC. For example, a first portion of the DRAM IC may be allocated as cache for the first control module. A second portion of the DRAM IC may be allocated as cache for the second control module. A third portion of the DRAM IC may be allocated as cache for the third control module. A fourth portion of the DRAM IC may not be allocated as cache.

As a further example, the above-described examples may also be implemented in a server system. The server system may be referred to as a storage system and include multiple servers. The servers include respective storage systems, which are in communication with each other via a network (or cloud). One or more of the storage systems may be located in the cloud. Each of the storage systems may include respective SoCs.

The SoCs may have respective first DRAMs, second DRAMs, solid-state non-volatile memories, non-volatile memories and I/O ports. The I/O ports may be in communication with the cloud via respective I/O channels, such as peripheral component interconnect express (PCIe) channels, and respective network interfaces, such as such as peripheral component interconnect express (PCIe) channels. The I/O ports, I/O channels, and network interfaces may be Ethernet ports, channels and network interfaces and transfer data at predetermined speeds (e.g., 1 gigabit per second (Gb/s), 10 Gb/s, 50 Gb/s, etc.). Some of the network interfaces may be located in the cloud. The connection of multiple storage systems provides a low-cost, distributed, and scalable server system. Multiples of the disclosed storage systems and/or server systems may be in communication with each other and be included in a network (or cloud).

The solid-state non-volatile memories may each include, for example, NAND flash memory and/or other solid-state memory. The non-volatile memories may each include solid-state memory and/or rotating magnetic media. The non-volatile memories may each include a SSD and/or a HDD.

The architecture of the server system provides DRAMs as caches. The DRAMs may be allocated as L4 and/or highest level caches for the respective SoCs and have a high-bandwidth and large storage capacity. The stacked DRAMs may include, for example, DDR3 memory, DDR4 memory, low power double data rate type four (LPDDR4) memory, wide-I/O2 memory, HMC memory, and/or other suitable DRAM. Each of the SoCs may have one or more control modules. The control modules communicate with the corresponding DRAMs via respective ring buses. The ring buses may be bi-directional buses. This provides high-bandwidth and minimal latency between the control modules and the corresponding DRAMs.

Each of the control modules may access data and/or programs stored: in control modules of the same or different SoC; in any of the DRAMs; in any of the solid-state non-volatile memories; and/or in any of the non-volatile memories.

The SoCs and/or ports of the SoCs may have medium access controller (MAC) addresses. The control modules (or processors) of the SoCs may have respective processor cluster addresses. Each of the control modules may access other control modules in the same SoC or in another SoC using the corresponding MAC address and processor cluster address. Each of the control modules of the SoCs may access the DRAMs. A control module of a first SoC may request data and/or programs stored in a DRAM connected to a second SoC by sending a request signal having the MAC address of the second SOC and the processor cluster address of a second control module in the second SoC.

Each of the SoCs and/or the control modules in the SoCs may store one or more address translation tables. The address translation tables may include and/or provide translations for: MAC addresses of the SoCs; processor cluster addresses of the control modules; processor physical addresses of memory cells in the DRAMs, the solid-state non-volatile memories, and the non-volatile memories; and/or physical block addresses of memory cells in the DRAMs, the solid-state non-volatile memories, and the non-volatile memories. In one embodiment, the DRAM controller generates DRAM row and column address bits form a virtual address.

As an example, data and programs may be stored in the solid-state non-volatile memories and/or the non-volatile memories. The data and programs and/or portions thereof may be distributed over the network to the SoCs and control modules. Programs and/or data needed for execution by a control module may be stored locally in the DRAMs, a solid-state non-volatile memory, and/or a non-volatile memory of the SoC in which the control module is located. The control module may then access and transfer the programs and/or data needed for execution from the DRAMs, the solid-state non-volatile memory, and/or the non-volatile memory to caches in the control module. Communication between the SoCs and the network and/or between the SoCs may include wireless communication.

As a further example, the above-described examples may also be implemented in a server system that includes SoCs. Some of the SoCs may be incorporated in respective servers and may be referred to as server SoCs. Some of the SoCs (referred to as companion SoCs) may be incorporated in a server of a first SoC or may be separate from the server of the first SoC. The server SoCs include respective: clusters of control modules (e.g., central processing modules); intra-cluster ring buses, FLC modules, memory control modules, FLC ring buses, and one or more hopping buses. The hopping buses extend (i) between the server SoCs and the companion SoCs via inter-chip bus members and corresponding ports and (ii) through the companion SoCs. A hopping bus may refer to a bus extending to and from hopping bus stops, adaptors, or nodes and corresponding ports of one or more SoCs. A hopping bus may extend through the hopping bus stops and/or the one or more SoCs. A single transfer of data to or from a hopping bus stop may be referred to as a single hop. Multiple hops may be performed when transferring data between a transmitting device and a receiving device. Data may travel between bus stops each clock cycle until the data reaches a destination. Each bus stop disclosed herein may be implemented as a module and include logic to transfer data between devices based on a clock signal. Also, each bus disclosed herein may have any number of channels for the serial and/or parallel transmission of data.

Each of the clusters of control modules has a corresponding one of the intra-cluster ring buses. The intra-cluster ring buses are bi-directional and provide communication between the control modules in each of the clusters. The intra-cluster ring buses may have ring bus stops for access by the control modules to data signals transmitted on the intra-cluster ring buses. The ring bus stops may perform as signal repeaters and/or access nodes. The control modules may be connected to and access the intra-cluster ring buses via the ring bus stops. Data may be transmitted around the intra-cluster ring buses from a first control module at a first one of the ring bus stops to a second control module at a second one of the ring bus stops. Each of the control modules may be a central processing unit or processor.

Each of the memory control modules may control access to the respective one of the FLC modules. The FLC modules may be stacked on the server SoCs. Each of the FLC modules includes a FLC (or DRAM) and may be implemented as and operate similar to any of the FLC modules disclosed herein. The memory control modules may access the FLC ring buses at respective ring bus stops on the FLC ring buses and transfer data between the ring bus stops and the FLC modules. Alternatively, the FLC modules may directly access the FLC ring buses at respective ring bus stops. Each of the memory control modules may include memory clocks that generate memory clock signals for a respective one of the FLC modules and/or for the bus stops of the ring buses and/or the hopping buses. The bus stops may receive the memory clock signals indirectly via the ring buses and/or the hopping buses or directly from the memory control modules. Data may be cycled through the bus stops based on the memory clock signal.

The FLC ring buses may be bi-directional buses and have two types of ring bus stops $S_{RB}$ and $S_{RH}$. Each of the ring bus stops may perform as a signal repeater and/or as an access node. The ring bus stops $S_{RB}$ are connected to devices other than hopping buses. The devices may include: an inter-cluster ring bus0; the FLC modules and/or memory control modules; and graphics processing modules. The inter-cluster ring bus provides connections (i) between the clusters, and (ii) between intersection rings stops. The intersection ring bus stops provide access to and may connect the inter-cluster ring bus to ring bus extensions that extend between (i) the clusters and (ii) ring bus stops. The ring bus stops are on the FLC ring buses. The inter-cluster ring bus and the intersection ring bus stops provide connections (iii) between the first cluster and the ring bus stop of the second FLC ring bus, and (iv) between the second cluster and the ring bus stop of the first FLC ring bus. This allows the control modules to access the FLC of the second FLC module and the control modules to access the FLC of the first FLC module.

The inter-cluster ring bus may include intra-chip traces and inter-chip traces. The intra-chip traces extend internal to the server SoCs and between (i) one of the ring bus stops and (ii) one of the ports. The inter-chip traces extend external to the server SoCs and between respective pairs of the ports.

The ring bus stops $S_{RH}$ of each of the server SoCs are connected to corresponding ones of the FLC ring buses and hopping buses. Each of the hopping buses has multiple hopping bus stops $S_{HB}$, which provide respective interfaces access to a corresponding one of the hopping buses. The hopping bus stops $S_{HB}$ may perform as signal repeaters and/or as access nodes.

The first hopping bus, a ring bus stop, and first hopping bus stops provide connections between (i) the FLC ring bus and (ii) a liquid crystal display (LCD) interface in the server SoC and interfaces of the companion SoCs. The LCD interface may be connected to a display and may be controlled via the GPM. The interfaces of the companion SoC include a serial attached small computer system interface (SAS) interface and a PCIe interface. The interfaces of the companion SoC may be image processor (IP) interfaces.

The interfaces are connected to respective ports, which may be connected to devices, such as peripheral devices. The SAS interface and the PCIe interface may be connected respectively to a SAS compatible device and PCIe compatible device via the ports. As an example, a storage drive may be connected to the port. The storage drive may be a hard disk drive, a solid-state drive, or a hybrid drive. The ports may be connected to image processing devices. Examples of image processing devices are disclosed above. The fourth SoC may be daisy chained to the third SoC via the inter-chip bus member (also referred to as a daisy chain member). The inter-chip bus member is a member of the first hopping bus. Additional SoCs may be daisy chained to the fourth SoC via port, which is connected to the first hopping bus. The server SoC, the control modules, and the FLC module may communicate with the fourth SoC via the FLC ring bus, the first hopping bus and/or the third SoC. As an example, the SoCs may be southbridge chips and control communication and transfer of interrupts between (i) the server SoC and (ii) peripheral devices connected to the ports.

The second hopping bus provides connections, via a ring bus stop and second hopping bus stops, between (i) the FLC ring bus and (ii) interfaces in the server SoC. The interfaces in the server SoC may include an Ethernet interface, one or more PCIe interfaces, and a hybrid (or combination) interface. The Ethernet interface may be a 10GE interface and is connected to a network via a first Ethernet bus. The Ethernet interface may communicate with the second SoC via the first Ethernet bus, the network and a second Ethernet bus. The network may be an Ethernet network, a cloud network, and/or other Ethernet compatible network. The one or more PCIe interfaces may include as examples a third generation PCIe interface PCIe3 and a mini PCIe interface (mPCIe). The PCIe interfaces may be connected to solid-state drives. The hybrid interface may be SATA and PCIe compatible to transfer data according to SATA and/or PCIe protocols to and from SATA compatible devices and/or PCIe compatible devices. As an example, the PCIe interface may be connected to a storage drive, such as a solid-state drive or a hybrid drive. The interfaces have respective ports for connection to devices external to the server SoC.

The third hopping bus may be connected to the ring bus via a ring bus stop and may be connected to a LCD interface and a port via a hopping bus stop. The LCD interface may be connected to a display and may be controlled via the GPM. The port may be connected to one or more companion SoCs. The fourth hopping bus may be connected to (i) the ring bus via a ring bus stop, and (ii) interfaces via hopping bus stops. The interfaces may be Ethernet, PCIe and hybrid interfaces. The interfaces have respective ports.

The server SoCs and/or other server SoCs may communicate with each other via the inter-cluster ring bus. The server SoCs and/or other server SoCs may communicate with each other via respective Ethernet interfaces and the network.

The companion SoCs may include respective control modules. The control modules may access and/or control access to the interfaces via the hopping bus stops. In one embodiment, the control modules are not included. The control modules may be connected to and in communication with the corresponding ones of the hopping bus stops and/or the corresponding ones of the interfaces.

As a further example, the above-described examples may also be implemented in a circuit of a mobile device. The mobile device may be a computer, a cellular phone, or other a wireless network device. The circuit includes SoCs. The SoC may be referred to as a mobile SoC. The SoC may be referred to as a companion SoC. The mobile SoC includes: a cluster of control modules; an intra-cluster ring bus, a FLC module, a memory control module, a FLC ring bus, and one or more hopping buses. The hopping bus extends (i) between the mobile SoC and the companion SoC via an inter-chip bus member and corresponding ports and (ii) through the companion SoC.

The intra-cluster ring bus is bi-directional and provides communication between the control modules. The intra-cluster ring bus may have ring bus stops for access by the control modules to data signals transmitted on the intra-cluster ring bus. The ring bus stops may perform as signal repeaters and/or access nodes. The control modules may be connected to and access the intra-cluster ring bus via the ring bus stops. Data may be transmitted around the intra-cluster ring bus from a first control module at a first one of the ring bus stops to a second control module at a second one of the ring bus stops. Data may travel between bus stops each clock cycle until the data reaches a destination. Each of the control modules may be a central processing unit or processor.

The memory control module may control access to the FLC module. In one embodiment, the memory control module is not included. The FLC module may be stacked on the mobile SoC. The FLC module may a FLC or DRAM and may be implemented as and operate similar to any of the FLC modules disclosed herein. The memory control module may access the FLC ring bus at a respective ring bus stop on the FLC ring bus and transfer data between the ring bus stop and the FLC module. Alternatively, the FLC module may directly access the FLC ring bus a respective ring bus stop. The memory control module may include a memory clock that generates a memory clock signal for the FLC module, the bus stops of the ring bus and/or the hopping buses. The bus stops may receive the memory clock signal indirectly via the ring bus and/or the hopping buses or directly from the memory control module. Data may be cycled through the bus stops based on the memory clock signal.

The FLC ring bus may be a bi-directional bus and have two types of ring bus stops $S_{RB}$ and $S_{RH}$. Each of the ring bus stops may perform as a signal repeater and/or as an access node. The ring bus stops $S_{RB}$ are connected to devices other than hopping buses. The devices may include: the cluster; the FLC module and/or the memory control module; and a graphics processing module.

The ring bus stops $S_{RH}$ of the mobile SoC are connected to the FLC ring bus and a corresponding one of the hopping buses. Each of the hopping buses has multiple hopping bus stops $S_{HB}$, which provide respective interfaces access to a corresponding one of the hopping buses. The hopping bus stops $S_{HB}$ may perform as signal repeaters and/or as access nodes.

The first hopping bus, a ring bus stop, and first hopping bus stops are connected between (i) the FLC ring bus and (ii) a liquid crystal display (LCD) interface, a video processing module (VPM), and interfaces of the companion SoC. The LCD interface is in the server SoC and may be connected to a display and may be controlled via the GPM. The interfaces of the companion SoC include a cellular interface, a wireless local area network (WLAN) interface, and an image signal processor interface. The cellular interface may include a physical layer device for wireless communication with other mobile and/or wireless devices. The physical layer device may operate and/or transmit and receive signals according to long-term evolution (LTE) standards and/or third generation (3G), fourth generation (4G), and/or fifth generation (5G) mobile telecommunication standards. The WLAN interface may operate according to Bluetooth®, Wi-Fi®, and/or other WLAN protocols and communicate with other network devices in a WLAN of the mobile device. The ISP interface may be connected to image processing devices (or image signal processing devices) external to the companion SoC, such as a storage drive or other image processing device. The interfaces may be connected to devices external to the companion SoC via respective ports. The ISP interface may be connected to devices external to the mobile device.

The companion SoC may be connected to the mobile SoC via the inter-chip bus member. The inter-chip bus member is a member of the first hopping bus. Additional SoCs may be daisy chained to the companion SoC via a port, which is connected to the first hopping bus. The mobile SoC, the control modules, and the FLC module may communicate with the companion SoC via the FLC ring bus and the first hopping bus.

The second hopping bus provides connections via a ring bus stop and second hopping bus stops between (i) the FLC ring bus and (ii) interfaces in the mobile SoC. The interfaces in the mobile SoC may include an Ethernet interface, one or more PCIe interfaces, and a hybrid (or combination) interface. The Ethernet interface may be a 10GE interface and is connected to an Ethernet network via a port. The one or more PCIe interfaces may include as examples a third generation PCIe interface PCIe3 and a mini PCIe interface (mPCIe). The PCIe interfaces may be connected to solid-state drives. The hybrid interface may be SATA and PCIe compatible to transfer data according to SATA and/or PCIe protocols to and from SATA compatible devices and/or PCIe compatible devices. As an example, the PCIe interface may be connected to a storage drive via a port. The storage drive may be a solid-state drive or a hybrid drive. The interfaces have respective ports for connection to devices external to the mobile SoC.

The companion SoC may include a control module. The control module may access and/or control access to the VPM and the interfaces via the hopping bus stops. In one embodiment, the control module is not included. The control module may be connected to and in communication with the hopping bus stops, the VPM, and/or the interfaces.

Cache Line Size

In this example embodiment, cache line size of 4 KBytes is selected. In other embodiments, other cache line sizes may be utilized. One benefit from using a cache line of this size is that it matches the size of a memory page size which is typically assigned, as the smallest memory allocation size, by the operating system to an application or program. As a result, the 4 KByte cache line size aligns with the operating memory allocations size.

A processor typically only reads or writes 64 Bytes at a time. Thus, the FLC cache line size is much larger, using 4 KBytes as an example. As a result, when a write or read request results in a miss at an FLC module, the system first reads a complete 4 KByte cache line from the storage drive (i.e. the final level of main memory in the storage drive partition). After that occurs, the system can write the processor data to the retrieved cache line, and this cache line is stored in a DRAM. Cache lines are identified by virtual addresses. Entire cache lines are pulled from memory at a time. Further, the entire cache line is forwarded, such as from the FLC-SS module to the FLC-HS module. There could be 100,000 or even 1 million and more cache lines in an operational system.

Comparing the FLC module caching to the CPU cache, these elements are separate and distinct caches. The CPU (processor cache) is part of the processor device as shown and is configured as in the prior art. The FLC modules act as cache, serve as the main memory, and are separate and distinct form the CPU caches. The FLC module cache tracks all the data that is likely to be needed over several minutes of operation much as a main memory and associated controller would. However, the CPU cache only tracks and stores what the processor needs or will use in the next few microseconds or perhaps a millisecond.

Fully Associative FLC Caches

Fully associative look up enables massive numbers of truly random processor tasks/threads to semi-permanently (when measured in seconds to minutes of time) reside in the FLC caches. This is a fundamental feature as the thousands of tasks or threads that the processors are working on could otherwise easily trash (disrupt) the numerous tasks/threads that are supposed to be kept in the FLC caches. Fully associative look up is however costly in terms of either silicon area, power or both. Therefore, it is also important that the FLC cache line sizes are maximized to minimize the number of entries in the fully associative look up tables. In fact, it is important that it should be much bigger that CPU cache line sizes which is currently at 64 B. At the same time the cache line sizes should not be too big as it would cause undue hardships to the Operating System (OS). Since modern OS typically uses 4 KB page size FLC cache line size is therefore, in one example embodiment, set at 4 KB. If, in the future, the OS page size is increased to say 16 KB, then the FLC cache line size could theoretically be made to be 16 KB as well.

In order to hide the energy cost of the fully associative address look up process, in one embodiment, an address cache for the address translation table is included in the FLC controller. It is important to note that the address cache is not caching any processor data. Instead it caches only the most recently seen address translations and the translations of physical addressed to virtual addresses. As such the optional address cache does not have to be fully associative. A simple set associative cache for the address cache is sufficient as even a 5% miss rate would already reduce the need to perform a fully associative look up process by at least twenty times. The address cache would additionally result in lower address translation latency as a simple set associative cache used in it could typically translate an address in 1 clock cycle. This is approximately ten to twenty times faster than the fastest multi stage hashing algorithm that could perform the CAM like address translation operation.

Storage Drive Memory Allocation

The storage drive 78 may be a traditional non-volatile storage device, such as a magnetic disk drive, solid state drive, hybrid drive, optic drive or any other type storage device. The DRAM associated with the FLC modules, as well as partitioned portion of the storage drive, serves as main memory. In the embodiment disclosed herein, the amount of DRAM is less than in a traditional prior art computing system. This provides the benefits of less power consumption, lower system cost, and reduced space requirements. In the event additional main memory is required for system operation, a portion of the storage drive 78 is allocated or partitioned (reserved) for use as additional main memory. The storage drive 78 is understood to have a storage drive controller and the storage drive controller will process requests from the processing device 500 for traditional file request and also requests from the FLC modules for information stored in the partition of the storage drive reserved as an extension of main memory.

Figure 4:
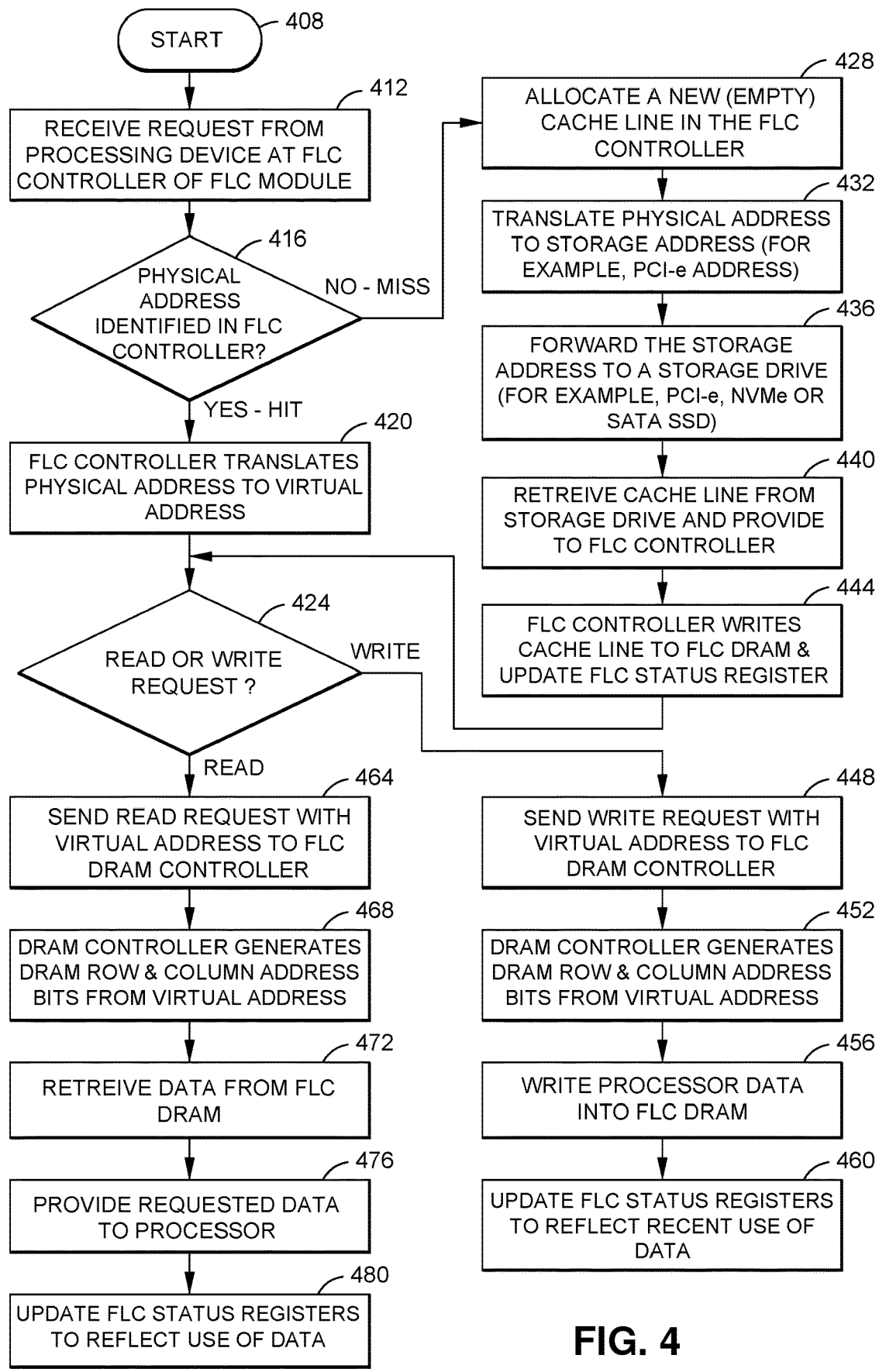
FIG. 4 illustrates a method of operating the data access system of FIG. 2.

FIG. 4 illustrates an exemplary method of operation of one example method of operation. This is but one possible method of operation and as such, other methods are contemplated that do not depart from the scope of the claims. This exemplary method of operation is representative of a FLC controller system such as shown in FIG. 2. Although the following tasks are primarily described with respect to the examples in FIGS. 2, the tasks may apply to other embodiments in the present disclosure. The tasks may be performed iteratively or in parallel.

This method starts at a step 408 where the system may be initialized. At a step 412 the FLC controller receives a request from the possessing device (processor) for a read or write request. The request includes a physical address that the processor uses to identify the location of the data or where the data is to be written.

At a decision step 416, a determination is made whether the physical address provided by the processor is located in the FLC controller. The memory (SRAM) of the FLC controller stores physical to virtual address map data. The physical address being located in the FLC controller, is designated as a hit while the physical address not being located in the FLC controller is designated as a miss. The processor's request for data (with physical address) can only be satisfied by the FLC module if the FLC controller has the physical address entry in its memory. If the physical address is not stored in the memory of the FLC controller, then the request must be forwarded to the storage drive.

If, at decision step 416 the physical address is identified in the FLC controller, then the request is considered a hit and the operation advances to a step 420. At step 420 the FLC controller translates the physical address to a virtual address based on a look-up operation using a look-up table stored in a memory of the FLC controller or memory that is part of the DRAM that is allocated for use by the FLC controller. The virtual address may be associated with a physical address in the FLC DRAM. The FLC controller may include one or more translation mapping tables for mapping physical addresses (from the processor) to virtual addresses. FIG. 5B illustrates the FLC controller with its memory in greater detail.

After translation of the physical address to a virtual address, the operation advances to a decision step 424. If at decision step 416, the physical address is not located in the FLC controller, a miss has occurred and the operation advances to step 428. At step 428, the FLC controller allocates a new (in this case empty) cache line in the FLC controller for the data to be read or written and which is not already in the FLC module (i.e the DRAM of the FLC module). An existing cache line could be overwritten if space is not otherwise available. Step 428 includes updating the memory mapping to include the physical address provided by the processor, thereby establishing the FLC controller as having that physical address. Next, at a step 432 the physical address is translated to a storage drive address, which is an address used by the storage drive to retrieve the data. In this embodiment, the FLC controller performs this step but in other embodiment other devices, such as the storage drive may perform the translation. The storage drive address is an address that is used by or understood by the storage drive. In one embodiment, the storage drive address is a PCI-e address.

At a step 436, the FLC controller forwards the storage address to the storage drive, for example, a PCI-e based device, a NVMe (non-volatile memory express) type device, a SATTA SSD device, or any other storage drive now known or developed in the future. As discussed above, the storage drive may be a traditional hard disk drive, SSD, or hybrid drive and a portion of the storage drive is used in the traditional sense to store files, such documents, images, videos, or the like. A portion of the storage drive is also used and partitioned as main memory to supplement the storage capacity provided by the DRAM of the FLC module(s).

Advancing to a step 440, the storage drive controller (not shown) retrieves the cache line, at the physical address provided by the processor, from the storage drive and the cache line is provided to the FLC controller. The cache line, identified by the cache line address, stores the requested data or is designated to be the location where the data is written. This may occur in a manner that is known in the art. At a step 444, the FLC controller writes the cache line to the FLC DRAM and it is associated with the physical address, such that this association is maintained in the loop-up table in the FLC controller.

Also part of step 444 is an update to the FLC status register to designate the cache line or data as most recently used. The FLC status register, which may be stored in DRAM or a separate register, is a register that tracks when a cache line or data in the FLC DRAM was lasted used, accessed or written by the processor. As part of the cache mechanism, recently used cache lines are maintained in the cache so that recently used data is readily available for the processor again when requested. Cache lines are least recently used, accessed or written to by the processor are overwritten to make room for more recently used cache lines/data. In this arrangement, the cache operates in a least recently used, first out basis. After step 444, the operation advances to step 424.

At decision step 424 the request from the processor is evaluated as a read request or a write request. If the request is a write request, the operation advances to step 448 and the write request is sent with the virtual address to the FLC DRAM controller. As shown in FIG. 2 and is understood in the art, DRAM devices have an associated memory controller to oversee read/write operations to the DRAM. At a step 452, the DRAM controller generates DRAM row and column address bits from the virtual address, which are used at a step 456 to write the data from the processor (processor data) to the FLC DRAM. Then, at a step 460, the FLC controller updates the FLC status register for the cache line or data to reflect the recent use of the cache line/data just written to the FLC DRAM. Because the physical address is mapped into the FLC controller memory mapping, that FLC controller now possess that physical address if requested by the processor.

Alternatively, if at decision step 424 is it determined that the request from the processor is a read request, then the operation advances to step 464 and the FLC controller sends the read request with the virtual address to the FLC DRAM controller for processing by the DRAM controller. Then at step 468, the DRAM controller generates DRAM row and column address bits from the virtual address, which are used at a step 472 to read (retrieve) the data from the FLC DRAM so that data can be provided to the processor. At a step 476, the data retrieved from FLC DRAM is provide to the processor to satisfy the processor read request. Then, at a step 480, the FLC controller updates the FLC status register for the data (address) to reflect the recent use of the data that was read from the FLC DRAM. Because the physical address is mapped into the FLC controller memory mapping, that FLC controller maintains the physical address in the memory mapping as readily available if again requested by the processor.

The above-described tasks of FIG. 4 are meant to be illustrative examples; the tasks may be performed sequentially, in parallel, synchronously, simultaneously, continuously, during overlapping time periods or in a different order depending upon the application. Also, any of the tasks may not be performed or skipped depending on the example and/or sequence of events.

Updating of FLC Status Registers

As discussed above, status registers maintain the states of cache lines which are stored in the FLC module. It is contemplated that several aspects regarding cache lines and the data stored in cache lines may be tracked. One such aspect is the relative importance of the different cache lines in relation to pre-set criteria or in relation to other cache lines. In one embodiment, the most recently accessed cache lines would be marked or defined as most important while least recently used cache lines are marked or defined as least important. The cache lines that are marked as the least important, such as for example, least recently used, would then be eligible for being kicked out of the FLC or overwritten to allow new cache lines to be created in FLC or new data to be stored. The steps used for this task are understood by one of ordinary skill in the art and thus not described in detail herein. However, unlike traditional CPU cache controllers, an FLC controller would additionally track cache lines that had been written by CPU/GPU. This occurs so that the FLC controller does not accidentally write to the storage drive, such as an SSD, when a cache line that had only been used for reading is eventually purged out of FLC. In this scenario, the FLC controller marks an FLC cache line that has been written as "dirty".

In one embodiment, certain cache lines may be designed as locked FLC cache lines. Certain cache lines in FLC could be locked to prevent accidental purging of such cache lines out of FLC. This may be particularly important for keeping the addresses of data in the FLC controller when such addresses/data can not tolerate a delay for retrieval, and thus will be locked and thus maintained in FLC, even if it was least recently used.

It is also contemplated that a time out timer for locked cache lines may be implemented. In this configuration, a cache line may be locked, but only for a certain period of time as tracked by a timer. The timer may reset after a period time from lock creation or after use of the cache line. The amount of time may vary based on the cache line, the data stored in the cache line, or the application or program assigned to the cache line.

Additionally, it is contemplated a time out bit is provided to a locked cache line for the following purposes: to allow locked cache lines to be purged out of FLC after a very long period of inactivity or to allow locked cache lines to be eventually purged to the next stage or level of FLC module and at the same time inherit the locked status bit in the next FLC stage to minimize the time penalty for cache line/data retrieval resulting from the previously locked cache line being purged from the high speed FLC module.

Figure 5A:
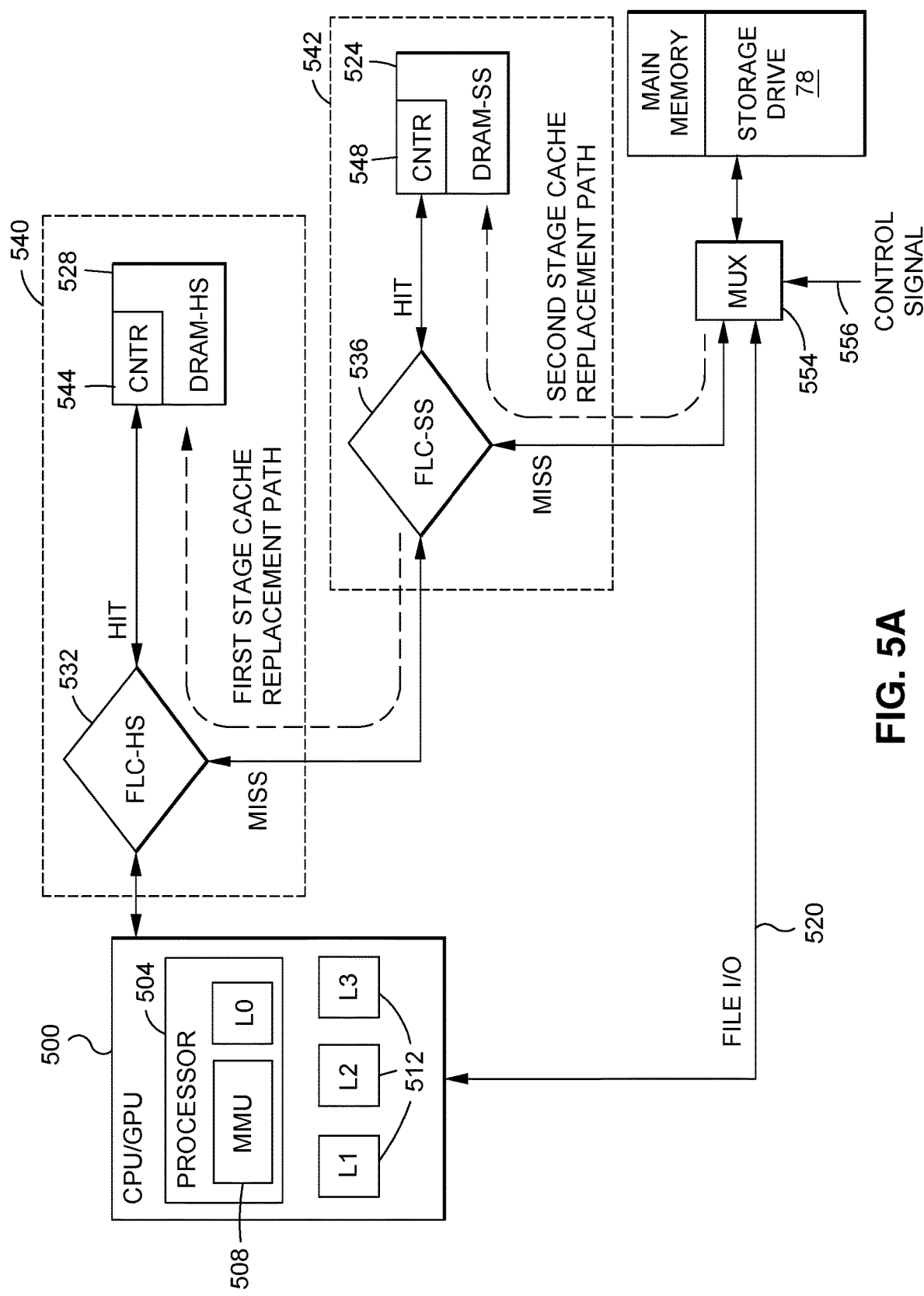
FIG. 5A is a block diagram of an example embodiment of a cascaded FLC system.
Figure 5B:
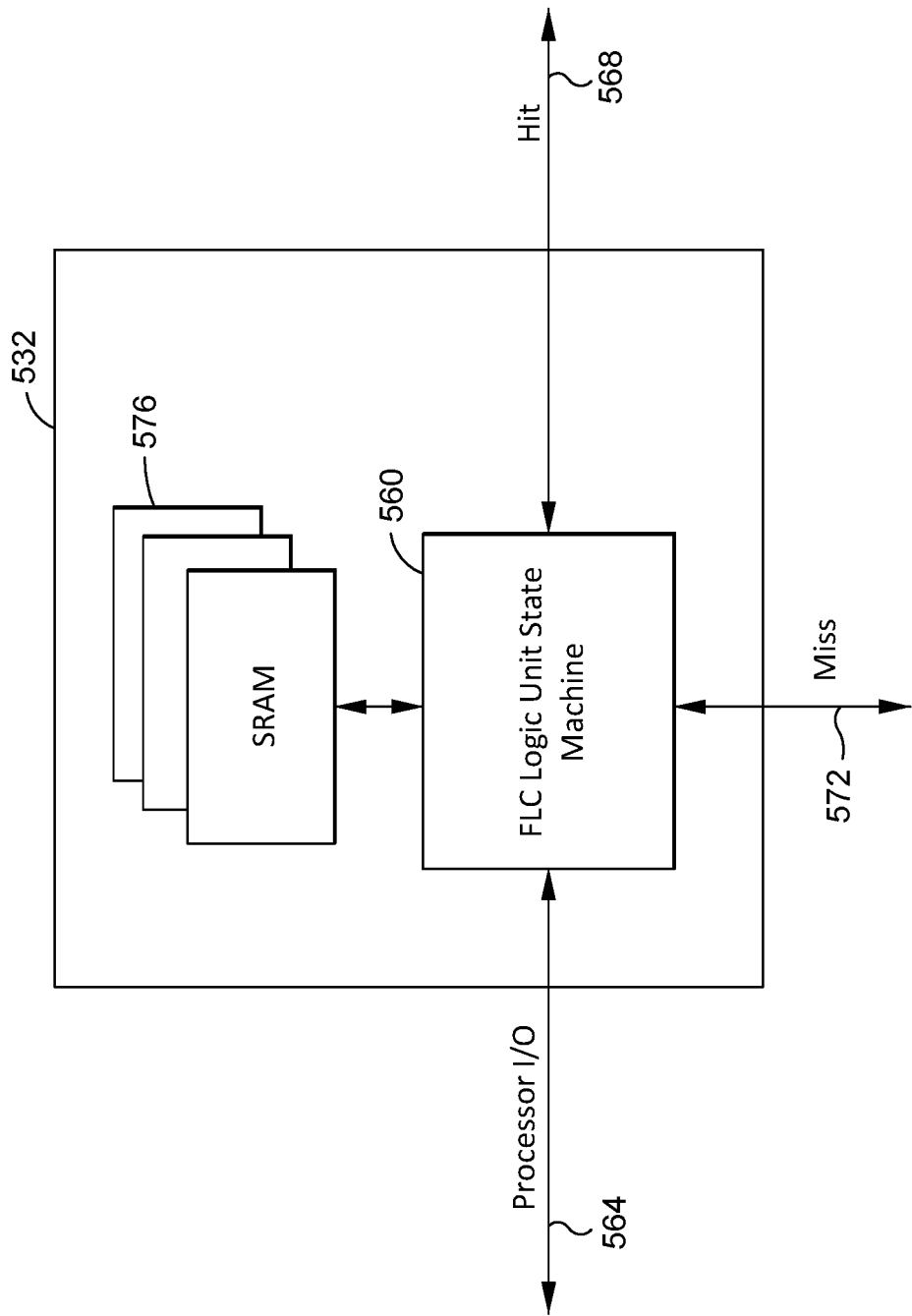
FIG. 5B is a block diagram of an example embodiment of a FCL controller.

FIG. 5A is a block diagram of an example embodiment of a cascaded FLC system. This is but one possible arrangement for a cascaded FLC system. Other embodiments are possible which do not depart from the scope of the claims.

In this embodiment, a processor 500 is provided. The processing device 500 may be generally similar to the processing device 72 shown in FIG. 2. The discussion of elements in FIG. 2 is incorporated and repeated for the elements of FIG. 5A. The processing device 500 may be a central processing unit (CPU), graphics processing unit (GPU), or any other type processing system including but not limited to a system on chip (SoC). The processing device 500 includes a processor 504 that include various levels of processor cache 512, such as level 0, level 1, level 2, and level 3 cache. A memory management module 508 is also provided to interface the processor 504 to the various levels of processor cache 512 and interface the processor, such as for data requests, to elements external to the processing device 500.

Also part of the embodiment of FIG. 5A is a storage drive 78. The storage drive 78 is generally similar to the storage drive 78 of FIG. 2 and as such is not described in detail again. The storage drive 78 may comprise a hard disk drive such as a traditional rotating device or a solid state drive, a combined hybrid drive. The storage drive 78 includes a controller (not shown) to oversee input and output functions. A file input/output path 520 connects the processing device 500 to the storage drive 78 through a multiplexer 554. The file I/O path 520 provides a path and mechanism for the processor to directly access the storage drive 78 for write operations, such as saving a file directly to the storage drive as may occur in a traditional system. The multiplexer 554 is a bi-directional switch which selectively passes, responsive to a control signal on control signal input 556, either the input from the FLC-SS 536 or the file I/O path 520.

In embodiments with an FLC as shown in FIGS. 2, 5A, 6, 8, 10, and 12, the storage drive has a section that is allocated, partitioned, or reserved to be an extension of main memory (extension of RAM memory). Hence, a portion of the storage drive 78 is used for traditional storage of user files such as documents, pictures, videos, music and which are viewable by the user in a traditional folder or directory structure. There is also a portion of the storage drive 78 which is allocated, partitioned, or reserved for use by the FLC systems to act as an extension of the DRAM main memory to store active programs and instructions used by the processor, such as the operating system, drivers, application code, and active data being processed by the processing device. The main memory is the computer system's short-term data storage because it stores the information the computer is actively using. The term main memory refers to main memory, primary memory, system memory, or RAM (random access memory). Data (operating system, drivers, application code, and active data) which is to be stored in the main memory but is least recently used, is stored in the main memory partition of the storage drive. In the embodiments of FIGS. 2, 5A, 6, 8, 10, and 12, and also other embodiments described herein, a system bus may be located between the processing device and the FLC modules as shown in FIG. 2.

Although the main memory partition of the storage drive 78 is slower than RAM for I/O operation, the hit rate for the FLC modules is so high, such as 99% or higher, that I/O to the main memory partition in the storage drive rarely occurs and thus does not degrade performance. This discussion of the storage drive 78 and its main memory partition applies to storage drives shown in the other figures. In all embodiments shown and described, the contents of the main memory partition of the storage drive may be encrypted. Encryption may occur to prevent viewing of personal information, Internet history, passwords, documents, emails, images that are stored in the main memory partition of storage drive 78 (which is non-volatile). With encryption, should the computing device ever be discarded, recycled, or lost, this sensitive information could not be read. Unlike the RAM, which does not maintain the data stored in when powered down, the storage drive will maintain the data even upon a power down event.

As shown in FIG. 5A are two final level cache (FLC) modules 540, 542 arranged in a cascaded configuration. Each module 540, 542 is referred to as FLC stage. Although shown with two cascaded stages, a greater number of stages may be cascaded. Each of FLC stages (modules) 540, 542 are generally similar to the FLC module 76 shown in FIG. 2 and as such, these units are not described in detail herein. In this cascaded configuration the FLC module 540 is a high speed (HS) module configured to operate at higher bandwidth, lower latency, and lower power usage than the other FLC module 542, which is a standard speed module. The benefits realized by the low power, high speed aspects of the FLC-HS module 542 are further increased due to the FLC-HS module being utilized more often than the FLC-SS. It is the primarily used memory and has a hit rate of greater than 99% thus providing speed and power savings on most all main memory accesses. The FLC module 542 is referred to as standard speed (SS) and while still fast, is optimized for lower cost than speed of operation. Because there is greater capacity of standard speed DRAM than high speed DRAM, the cost savings are maximized, and the amount of standard speed DRAM is less, in these FLC embodiments, than is utilized in prior art computers, which often come with 8 GB or 16 GB of RAM. An exemplary FLC system may have 4 GB of DRAM and 32 GB partition of the storage drive. This will result in a cost saving for a typical laptop computer, which has 8 to 16 GB of RAM, of about $200. Furthermore, because most of the memory accesses are successfully handled by the high speed FLC module, the standard speed FLC module is mostly inactive, and thus not consuming power. The benefits of this configuration are discussed below. It is contemplated that the memory capacity of the FLC-HS module 540 is less than the memory capacity of the FLC-SS module 542. In one embodiment the FLC-SS module's memory amount is eight (8) times greater than the amount of memory in the FLC-HS module. However, some applications may even tolerate more than 32× of capacity ratio.

It is noted that both the FLC-HS controller and the DRAM-HS are optimized for low power consumption, high bandwidth, and low latency (high speed). Thus, both elements provide the benefits described above. On the other hand, both the FLC-SS controller and the DRAM-SS are optimized for lower cost. In one configuration, the look-up tables of the FLC-HS controller are located in the FLC-HS controller and utilized SRAM or other high speed/lower power memory. However, for the FLC-SS, the look-up tables may be stored in the DRAM-SS. While having this configuration is slower than having the look-up tables stored in the FLC-SS controller, it is more cost effective to partition a small portion of the DRAM-SS for the look-up tables needed for the FLC-SS. In one embodiment, to reduce the time penalty of accessing the lookup table stored in the DRAM-SS a small SRAM cache of the DRAM-SS lookup table may be included to cache the most recently seen (used) address translations. Such an address cache does not have to be fully associative as only the address translation tables are being cached. A set associative cache such as that used in a CPU L2 and L3 cache is sufficient as even 5% misses already reduce the need of doing the address translation in the DRAM by a factor of 20×. This may be achieved with only a small percentage, such as 1000 out of 64,000, look-up table entries cached. The address cache may also be based on least recently used/first out operation.

In this embodiment the FLC module 540 includes an FLC-HS controller 532 and a DRAM-HS memory 528 with associated memory controller 544. The FLC module 542 includes an FLC-SS controller 536 and a DRAM-SS memory 524 with associated memory controller 548. The FCL-HS controller 532 connects to the processing device 500. The also connects to the DRAM-HS 528 and also to the FLC-SS controller 536 as shown. The outputs of the FLC-SS controller 536 connect to the DRAM-SS 524 and also to the storage drive 78.

The controllers 544, 548 of each DRAM 528, 524 operate as understood in the art to guide and control, read and write operation to the DRAM, and as such these elements and related operation are not described in detail. Although shown as DRAM it is contemplated that any type RAM may be utilized. The connection between controllers 544, 548 and the DRAM 528, 524 enable communication between these elements and allow for data to retrieved from and stored to the respective DRAM.

In this example embodiment, the FLC controllers 532, 536 include one or more look-up tables storing physical memory addresses which are may be translated to addresses which correspond to locations in the DRAM 528, 524. For example, the physical address may be converted to a virtual address and the DRAM controller may use the virtual address to generate DRAM row and column address bits. The DRAM 528, 524 function as cache memory. In this embodiment the look-up tables are full-associative thus having a one to one mapping and permits data to be stored in any cache block which leads to no conflicts between two or more memory address mapping to a single cache block.

As shown in FIG. 5A, the standard speed FLC module 542 does not directly connect to the processing device 500. By having only the high speed FLC module 540 connect to the processing device 500, the standard speed FLC module 542 is private to the high speed FLC module 540. It is contemplated that the one high speed FLC module could share one or more standard speed FLC modules. This arrangement does not slow down the processor by having to re-route misses in the FLC-HS controller 532 back through the processing device 500, to be routed to the standard speed FLC module 542 which would inevitably consume valuable system bus resources and create additional overhead for the processing device 500.

In general, during operation of a memory read event, a data request with a physical address for the requested data is sent from the processing device 500 to the FLC-HS controller 532. The FLC-HS controller 532 stores one or more tables of memory addresses accessible by the FLC-HS controller 532 in the associated DRAM-HS 528. The FLC-HS controller 532 determines if its memory tables contain a corresponding physical address. If the FLC-HS controller 532 contains a corresponding memory address in its table, then a hit has occurred that the FLC-HS controller 532 retrieves the data from the DRAM-HS 528 (via the controller 544), which is in turn provided back to the processing device 500 through the FLC-HS controller.

Alternatively, if the FLC-HS controller 532 does not contain a matching physical address the outcome is a miss, and the request is forwarded to the FLC-SS controller 536. This process repeats at the FLC-SS controller 536 such that if a matching physical address is located in the memory address look-up table of the FLC-SS controller 536, then the requested is translated or converted into a virtual memory address and the data pulled from the DRAM-SS 524 via the memory controller 548. The DRAM controller generates DRAM row and column address bits from the virtual address. In the event that a matching physical address is located in the memory address look-up table of the FLC-SS controller 536, then the data request and physical address is directed by the FLC-SS controller 536 to the storage drive.

If the requested data is not available in the DRAM-HS 528, but is stored and retrieved from the DRAM-SS, then the retrieved data is backfilled in the DRAM-HS when provided to the processor by being transferred to the FLC-SS controller 536 and then to the FLC-HS controller, and then to the processor 500. When backfilling the data, if space is not available in a DRAM-SS or DRAM-HS, then the least most recently used data or cache line will be removed or the data therein overwritten. In one embodiment, data removed from the high speed cache remains in the standard speed cache until additional space is needed in the standard speed cache. It is further contemplated that in some instances data may be stored in only the high speed FLC module and the not standard speed FLC module, or vice versa.

If the requested data is not available in the DRAM-HS 528 and also not available in the DRAM-SS 524 and is thus retrieved from the storage drive 78, then the retrieved data is backfilled in the DRAM-HS, the DRAM-SS, or both when provided to the processor. Thus, the most recently used data is stored in the DRAMs 528, 524 and overtime, the DRAM content is dynamically updated with the most recently used data. Least often used data is discarded from or overwritten in the DRAM 528, 524 to make room more recently used data. These back-fill paths are shown in FIG. 5A as the 'first stage cache replacement path' and the 'second stage cache replacement path'.

FIG. 5B is a block diagram of an example embodiment of an FLC controller. This is but one configuration of the base elements of an FLC controller. One of ordinary skill in the art will understand that additional elements, data paths, and support elements are present in a working system of all embodiments disclosed herein. These elements, data paths, and support elements are not shown, instead the focus being on the elements which support the disclosed innovations. The FLC controller 532 in FIG. 5B is representative of FLC controller 532 of FIG. 5A or other FLC controllers disclosed herein.

In FIG. 5B, an input/output path 564 to the processor (500, FIG. 5A) is shown. The processor I/O path 564 connects to a FLC logic unit state machine (state machine) 560. The state machine 500 may comprise any device capable of performing as described herein such as, but not limited to, and ASIC, control logic, state machine, processor, or any combination of these elements or any other element. The state machine 560 translates the system physical address to FLC virtual address. This state machine performs a fully associative lookup process using multiple stages of hashing functions. Alternatively, the state machine 560 could be or use a content addressable memory (CAM) to perform this translation but that would be expensive.

The state machine 560 connects to memory 576, such as for example, SRAM. The memory 576 stores look-up tables which contain physical addresses stored in the FLC controller. These physical addresses can be translated or mapped to virtual addresses which identify cache lines accessible by FLC controller 532. The memory 576 may store address maps and multiple hash tables. Using multiple hash tables reduce power consumption and reduce operational delay.

The state machine 560 and the memory 576 operate together to translate a physical address from the processing device to a virtual address. The virtual address is provided to the DRAM over a hit I/O line 568 when a 'hit' occurs. If the state machine 560 determines that its memory 576 does not contain the physical address entry, then a miss has occurred. If a miss occurs, then the FLC logic unit state machines provides the request with the physical address a miss I/O line 572 which leads to the storage drive or to another FLC controller.

Figure 6:
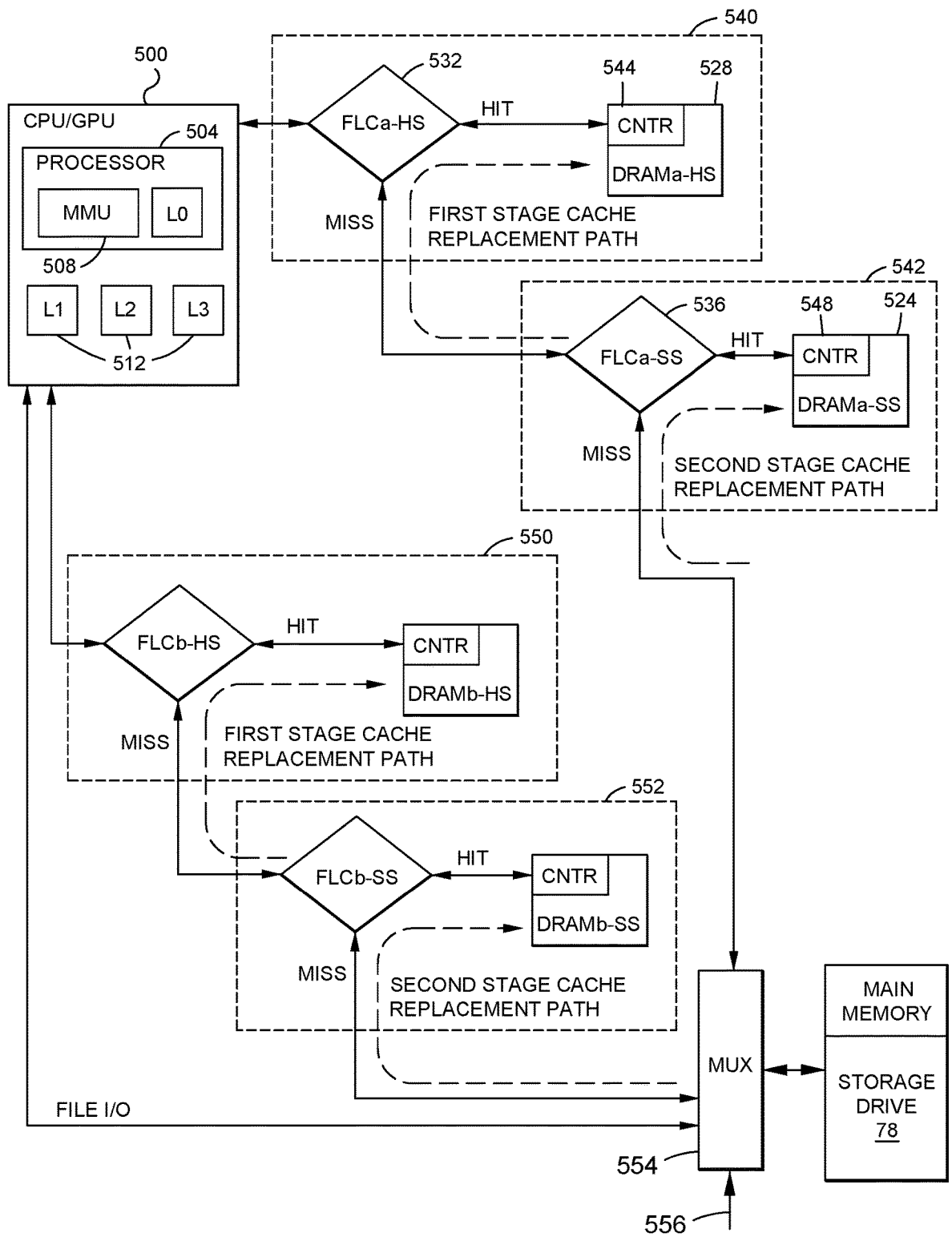
FIG. 6 is a block diagram of a cascaded FLC modules having two or more FLC modules.

FIG. 6 is a block diagram of parallel cascaded FLC modules. As compared to FIG. 5A, identical elements are labeled with identical reference numbers and are not described again. Added to this embodiment are one or more additional FLC module 550, 552. In this example embodiment, high speed FLC module 550 is generally identical to high speed FLC module 540 and standard speed FLC module 552 is generally identical to standard speed FLC module 542. As shown, the high speed FLC module 550 connects to the processing device 500 while the standard speed FLC module 552 connects to the storage drive 78 through the multiplexer 554. Both of the high speed FLC modules 540, 550 connect to the processing device 500, such as through a system bus.

Figure 7:
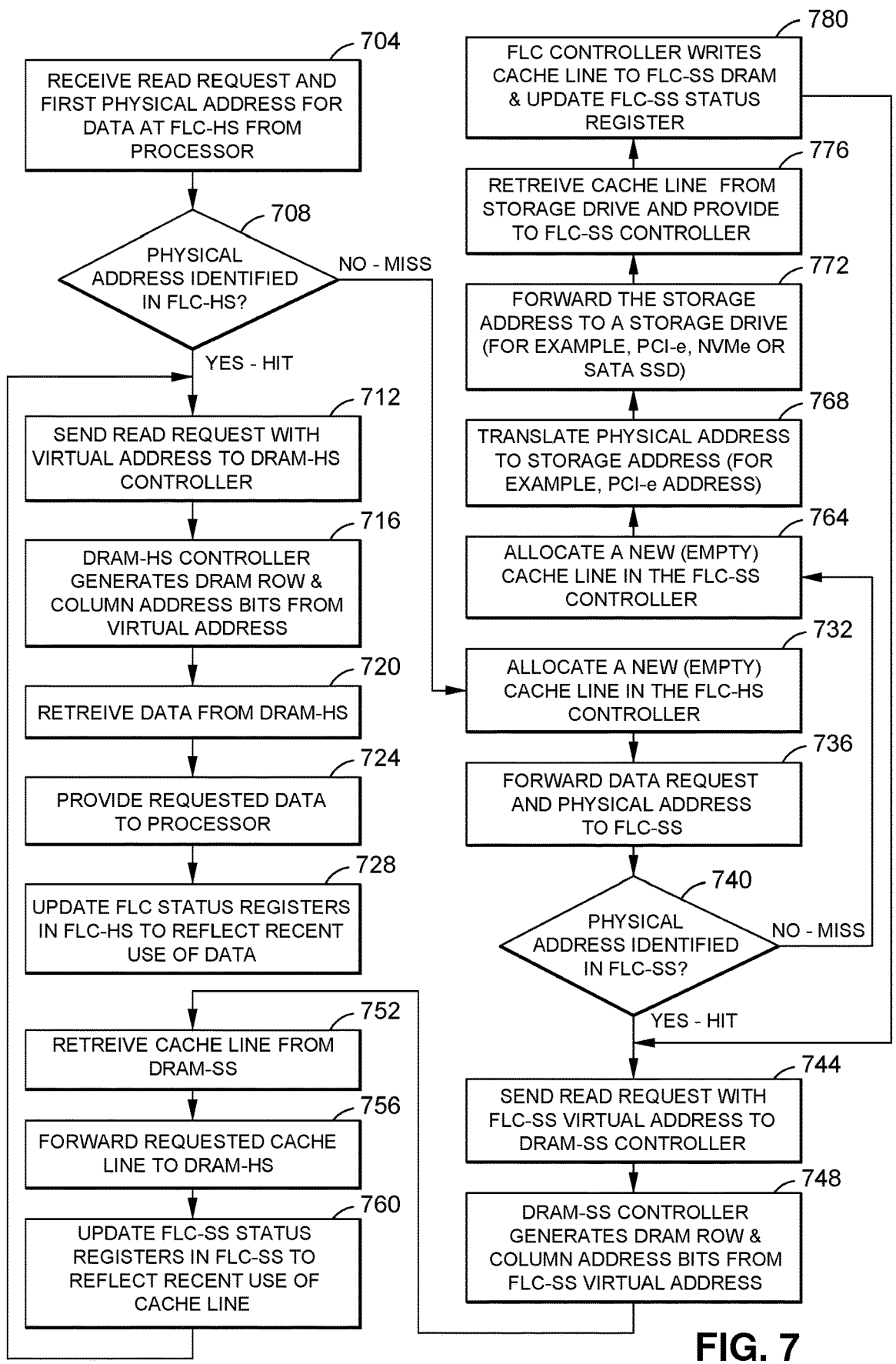
FIG. 7 is an operation flow diagram of an example method of operation of the cascaded FLC modules as shown in FIG. 5A.
Figure 8:
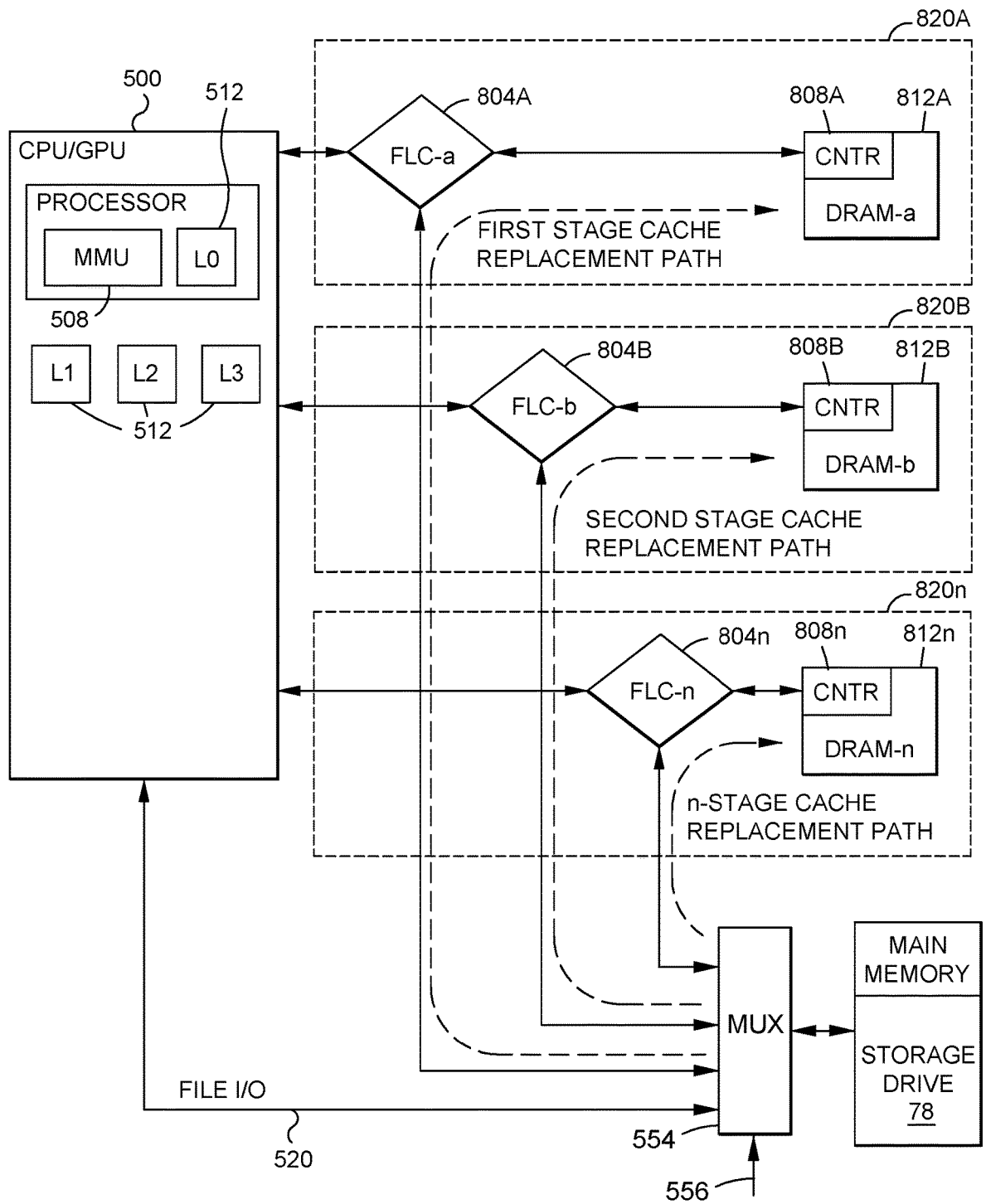
FIG. 8 is a block diagram of a split FLC module system having two or more separate FLC modules.

Operation of the embodiment of FIG. 6 is generally similar to the operation of the embodiment of FIG. 5A and FIG. 8. FIG. 7 provides an operational flow diagram of the embodiment of FIG. 5A. The configuration shown in FIG. 6 has numerous benefits over a single cascaded embodiment of FIG. 5A. Although more costly and consuming more space, having multiple parallel arranged cascaded FLC modules provide the benefit of segregating the memory addresses to different and dedicated FLC modules and allowing for parallel memory operations with the two or more FLC modules, while still having the benefits of multiple stages of FLC as discussed above in connection with FIG. 5A.

FIG. 7 is an operation flow diagram of an example method of operation of the cascaded FLC modules as shown in FIG. 5A. This is but one example method of operation and other methods of operation are contemplated as would be understood by one of ordinary skill in the art. At a step 704, a read request with a physical address for data is sent from the processing device (processor) to the FLC-HS module, and in particular to the FLC-HS controller. Then at a decision step 708, the FLC-HS controller determines if the physical address is identified in the look-up table of the FLC-HS controller. The outcome of decision step 708 may be a hit or a miss.

If the physical address is located at step 708, then the outcome is a hit and the operation advances to a step 712. At step 712, the read request is sent with the virtual address to the DRAM-HS controller. As shown in FIG. 2 and is understood in the art, DRAM devices have an associated memory controller to oversee read/write operations to the DRAM. At a step 716, the DRAM controller generates DRAM row and column address bits from the virtual address, which are used at a step 720 to read (retrieve) the data or cache line from the DRAM-HS. At a step 724 the FLC-HS controller provides the data to the processor to satisfy the request. Then, at a step 728, the FLC-HS controller updates the FLC status register for the cache line (address or data) to reflect the recent use of the cache line. In one embodiment, the data is written to the DRAM-HS and also written to the FLC-SS module.

Alternatively, if at step 708 the physical address is not identified in the FLC-HS, then the operation advances to step 732 and a new (empty) cache line is allocated in the FLC-HS controller, such as the memory look-up table and the DRAM-HS. Because the physical address was not identified in the FLC-HS module, space must be created for a cache line. Then, at a step 736, the FLC-HS controller forwards the data request and the physical address to the FLC-SS module.

As occurs in the FLC-HS module, at a decision step 740 a determination is made whether the physical address is identified in the FLC-SS. If the physical address is in the FLC-SS module, as revealed by the physical address being present in a look-up table of the FLC-SS controller, then the operation advances to a step 744. At step 744, the read request is sent with the virtual address to the DRAM-SS controller. At a step 748, the DRAM-SS controller generates DRAM row and column address bits from the virtual address, which are used at a step 752 to read (retrieve) the data from the DRAM-SS. The virtual address of the FLC-HS is different than the virtual address of the FLC-SS so a different conversion of the physical address to virtual address occurs in each FLC controller.

At a step 724 the FLC-HS controller forwards the requested cache line to the FLC-HS controller, which in turn provides the cache lines (with data) to the DRAM-HS so that it is cached in the FLC-HS module. Eventually, the data is provided from the FLC-HS to the processor. Then, at a step 760, the FLC-HS controller updates the FLC status register for the data (address) to reflect the recent use of the data provided to the FLC-HS and then to the processor.

If at step 740 the physical address is not identified in the FLC-SS, then a miss has occurred in the FLC-SS controller and the operation advances to a step 764 and new (empty) cache line is allocated in the FLC-SS controller. Because the physical address was not identified in the FLC-SS controller, then space must be created for a cache line. At a step 768 the FLC-SS controller translates the physical address to a storage drive address, such as for example a PCI-e type address. The storage drive address is an address understood by or used by the storage drive to identify the location of the cache line. Next, at a step 772, the storage drive address, resulting from the translation, is forwarded to the storage drive, for example, PCI-e, NVMe, or SATA SSD. At a step 776, using the storage drive address, the storage drive controller retrieves the data and the retrieved data is provided to the FLC-SS controller. At a step 780, the FLC-SS controller writes the data to the FLC-SS DRAM and updates the FLC-SS status register. As discussed above, updating the status register occurs to designate the cache line as recently used, thereby preventing it from being overwritten until it becomes a least recently used. Although tracking of least recently used status is tracked on a cache line basis, it is contemplated that least recently used status could be tracked for individual data items within cache lines, but this would add complexity and additional overhead burden.

In one embodiment, a cache line is retrieved from the storage drive as shown at step 764 and 752. The entire cache line is provided to the FLC-HS controller. The FLC-HS controller stores the entire cache line in the DRAM-HS. The data requested by the processor is stored in this cache line. To satisfy the processors request, the FLC-HS controller extracts the data from the cache line and provides the data to the processor. This may occur before or after the cache line is written to the DRAM-HS. In one configuration, the only the cache line is provided from the FLC-SS controller to the FLC-HS controller, and then the FLC-HS controller extracts the data requested by the processor from the cache line. In another embodiment, the FLC-SS controller provides first the requested data and then the cache line to the FLC-HS controller. The FLC-HS controller can then provide the data processor and then or concurrently write the cache line to the FLC-HS. This may be faster as the extracted data is provided to the FLC-HS controller first.

As mentioned above, the virtual addresses of the FLC-HS controller are not the same as the virtual addresses of the FLC-SS controller. The look-up tables, in each FLC controller are distinct and have no relationship between them. As a result, each FLC controllers virtual address set is also unique. It is possible that virtual address could, by chance, have the same bits between them but the virtual addresses are different as they are meant to be used in their respective DRAM (DRAM-HS and DRAM-SS).

FIG. 8 is a block diagram of a split FLC module system having two or more separate FLC modules. This is but one possible embodiment of a split FLC module system and it is contemplated that different arrangements are possible without departing from the scope of the claims. As compared to FIG. 5A, identical elements are labeled with identical reference numbers and these duplicate elements are not described again in detail.

As shown in FIG. 8, a first (a), second (b) up to n number of stages of FLC modules 802 are provided in a parallel to enable parallel processing of memory requests. The value of n may be any whole number. In reference to the first FLC module 820A, a FLCa controller 804A connects to or communicates with the processing unit 500 to receive read or write requests. A system bus (not shown) may reside between the FLC modules 820 and the processing device 500 such that communications and request routing may occur through a system bus. The FLCa controller 804A also connects to a DRAM memory controller 808A associated with a DRAMa 812A. The FLCa controller 804A also directly connects to or communicates with the storage drive 78. Each of the other FLC modules 820B, 820n are similarly configured with each element sharing the same reference numbers but with different identifier letters. For example, the FLC module 820B includes FLCb controller 804B, DRAM memory controller 808B, and DRAMb 812B. FLC module 820B also connects to or communicates with the processing device 500 and the storage drive 78 as shown. Although shown with a single processing device 500, it is contemplate that additional processing devices (GPU/audio processing unit/ . . . ) may also utilized the FLC modules 820

One or more of the FLC modules 820 may be configured as high speed FLC modules, which have high speed/low latency/low power DRAM or the FLC modules may be standard speed modules with standard speed DRAM. This allows for different operational speed for different FLC modules. This in turn accommodates the processing modules 500 directing important data read/write requests to the high-speed FLC module while less important read/write requests are routed to the standard speed FLC modules.

In one embodiment, each FLC slice (FLCa, FLCb, FLCc) connects to a SoC bus and each FLC slice is assigned an address by the processing device. Each FLC slice is a distinct element aid separate and distinct memory loo-up tables. A bus address look-up table or hash table may be used to map memory addresses to FLC slices. In one configuration, certain bits in the physical address define which FLC slice is assigned to the address. In another embodiment, a bi-directional multiplexer (not shown) may be provided between the FLC slices and the processing unit 500 to control access to each FLC slice, but this arrangement may create a bottleneck which slows operation.

It is also contemplated that the embodiments of FIG. 5A and FIG. 8 may be combined such that a system may be assembled which has one or more FLC modules 820A with a single FLC controller 804A and also one or more cascaded FLC modules as shown in FIG. 5A. The benefit of combining these two different arrangements is that the benefits of both arrangements are achieved. There are multiple paths from the processor to access DRAM thereby increasing system speed and bandwidth while also providing the benefits of a high speed, two stage, FLC controller to increase speed, bandwidth and lower power consumption. Combined systems may be arranged in any manner to tailor the system to meet design needs.

Figure 9:
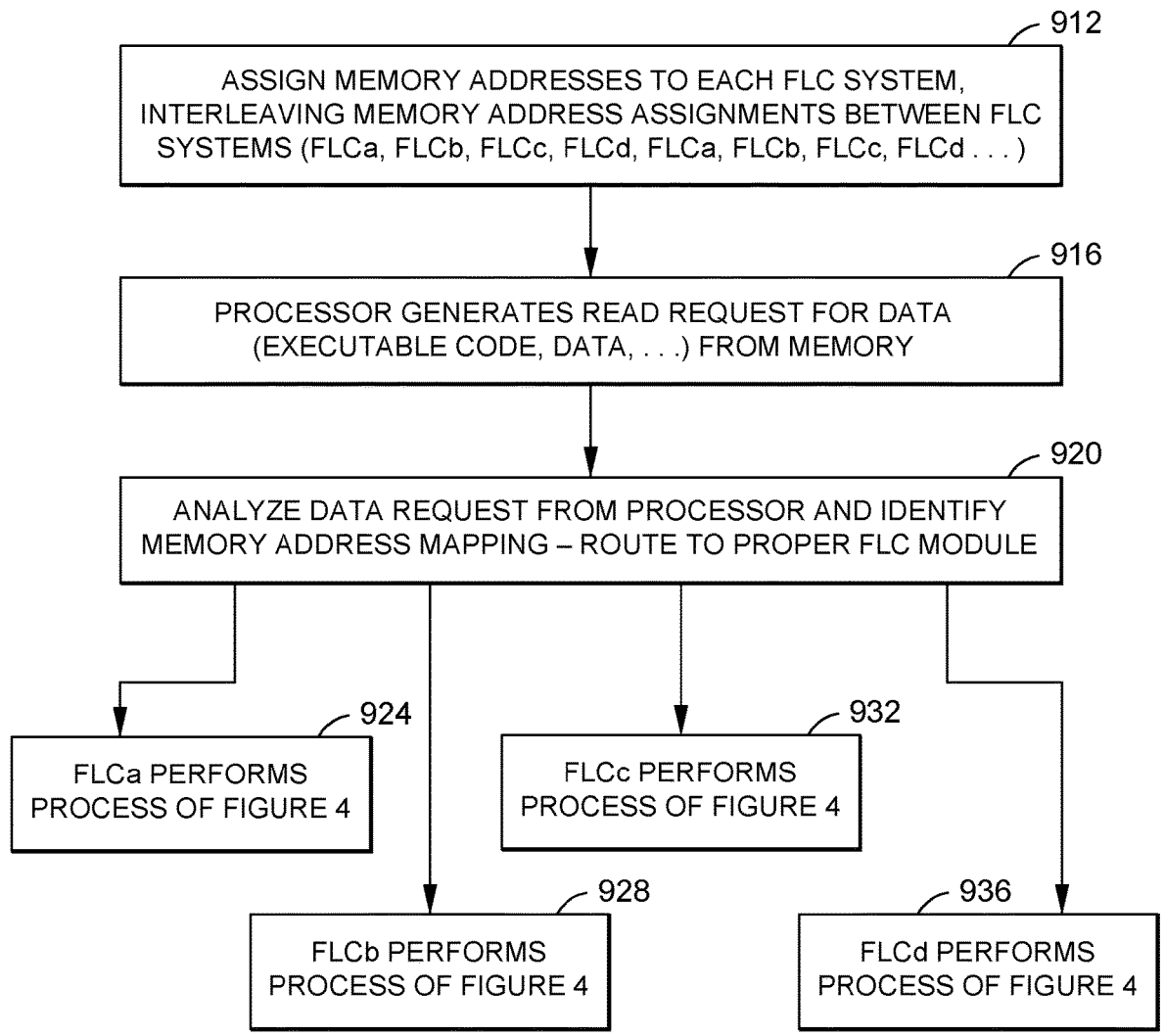
FIG. 9 is an operation flow diagram of an example method of operation of the split FLC modules as shown in FIG. 8.

FIG. 9 is an operation flow diagram of an example method of operation of the split FLC modules as shown in FIG. 8. This is but one example method of operation and other methods of operation are contemplated as would be understood by one of ordinary skill in the art. Prior to initiation of the method a memory look-up table is provided as part of the processing device or the system bus. The look-up table is configured to store associations between the addresses from the processor and the FLC modules. Each FLC module may be referred to in this embodiment as a slice, and each FLC slice may have multiple FLC stages.

In this embodiment, multiple FLC slices are established to increase FLC capacity and bandwidth. Each FLC slices are allocated to a portion of the system bus memory address space (regions). Moreover, these memory regions are interleaved among the FLC slices. The interleaving granularity is set to match the FLC cache line sizes to prevent unwanted duplications (through overlapping) of FLC look up table entries in the different FLC controller slices and ultimately to maximize the FLC hit rates.

One example embodiment, the mapping assigns, in interleaved order, address blocks of FLC cache line size, to the FLC modules. For example, for an FLC implementation with cache line sizes of 4 KB and for an implementation of four different FLCs (FLCa, FLCb, FLCc, FLCd) the following mapping (assignment) of memory
identified, by the physical addresses, to the FLCs is as follows:
1st 4 KB—FLCa
2nd 4 KB—FLCb
3rd 4 KB—FLCc
4th 4 KB—FLCd
5th 4 KB—FLCa
6th 4 KB—FLCb
7th 4 KB—FLCc
8th 4 KB—FLCd
9th 4 KB—FLCa.

This memory mapping assignment scheme continues following this pattern. This may be referred to as memory mapping with cache line boundaries to segregate the data to different FLC modules. In this matter, the memory addresses used by the processing device are divided among the FLC slices thereby creating a parallel arranged FLC system that allows for increased performance without any bottlenecks. This allows multiple different programs to utilize only one FLC module, or spread their memory usage among all the FLC modules which increases operational speed and reduces bottlenecks.

In one embodiment, each FLC slice corresponds to a memory address. In this example method of operation, there are four FLC slices, defined as FLCa, FLCb, FLCc, and FLCd. Each FLC slice has a unique code that identifies the FLC slice. For example, exemplary memory addresses are provided below with FLC slice assignments:
addresses xxxx-00-xxxxx is assigned to FLCa,
addresses xxxx-01-xxxxx is assigned to FLCb
addresses xxxx-10-xxxxx is assigned to FLCc addresses xxxx-11-xxxxx is assigned to FLCd where the x's are any combinations of "0" and "1". In other embodiment, other addressing mapping schemes may be utilized.

Any other address block mapping schemes with integer number of FLC cache line size could be used. With partial or non-integer block sizes there could be duplicates of look up table entries in the different FLC slices. While this may not be fatal it would nonetheless result in a smaller number of distinct address look up table entries and ultimately impact FLC cache hit performance.

Returning to FIG. 9, at a step 912 the memory addresses are assigned to each FLC module (in this embodiment FLC1, FLC2, FLC3 but other embodiments may have a greater or fewer number of FLC modules. The assignment may be made as described above in interleaved manner. Then, at a step 916 the processing device generates a read request for data stored in the memory. In other embodiments, the request could be a write request. At a step 920, the data request from the processing device is analyzed and based on the memory mapping, the data request (with physical address) is routed to the proper FLC. This may occur in the system bus. Based on the above provided exemplary memory address association, if the physical memory is xxxx-00-xxxxx, this address maps to FLCa, and the address is routed to a processor bus port assigned to FLCa. Then the operation advances to step 924 where the method of FIG. 4 occurs for the data request and physical address. If the memory address is xxxx-01-xxxxx, this address will map to FLCb and the operation advances to step 928. If the physical memory address is xxxx-10-xxxxx, it maps to FLCc, and the operation advances to step 932 where the method of FIG. 4 occurs for the data request and physical address. If the physical memory address is xxxx-11-xxxxx, this address maps to FLCd, and the operation advances to step 936 where the method of FIG. 4 occurs for the data request and physical address. The method of FIG. 4 and it's discussion is incorporated into this discussion of FIG. 9.

Figure 10:
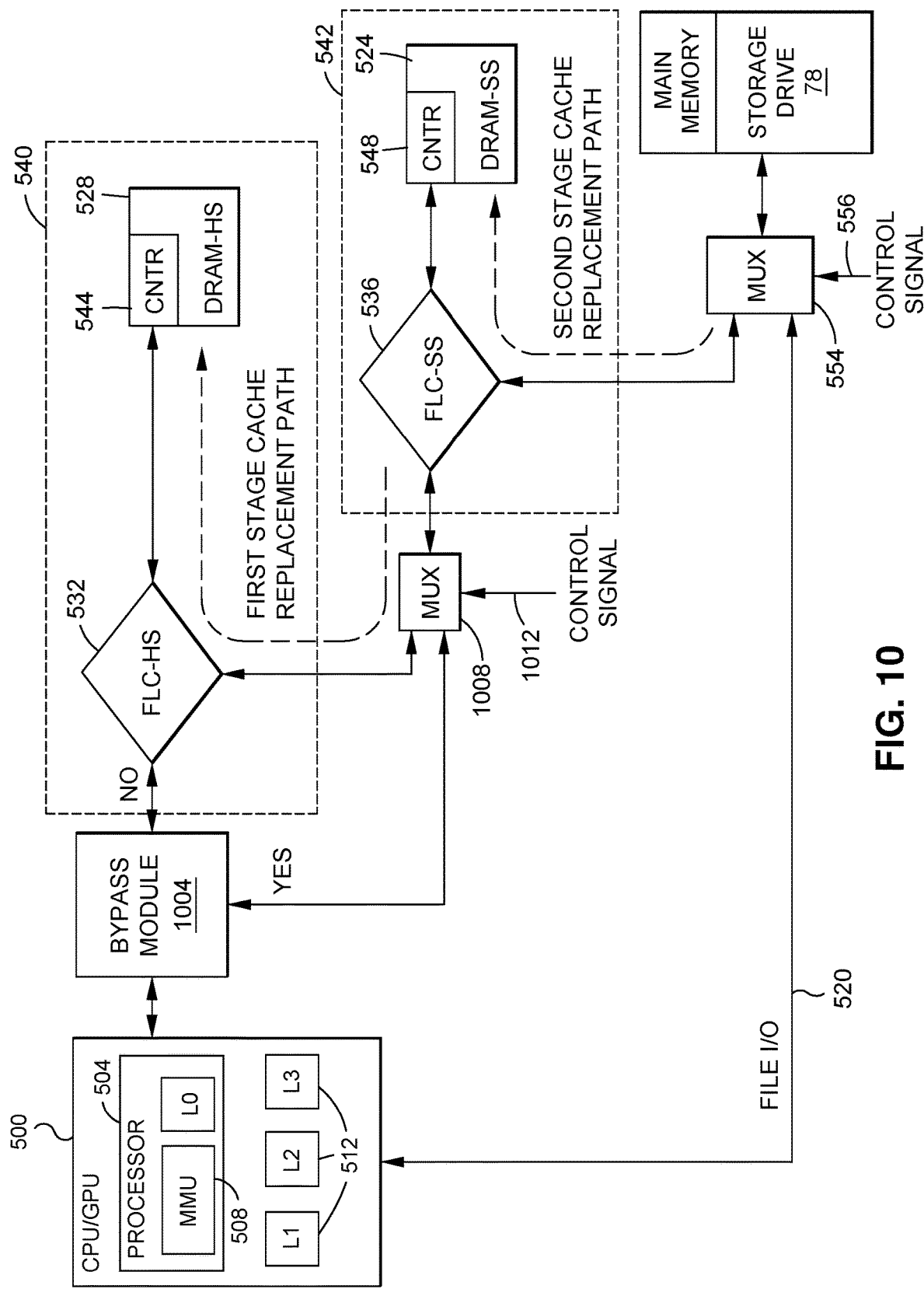
FIG. 10 is an exemplary block diagram of an example embodiment of a cascaded FLC system with a bypass path.

FIG. 10 is an exemplary block diagram of an example embodiment of a cascaded FLC system with a bypass path. As compared to FIG. 5A, identical elements are labeled with identical reference numbers. In this embodiment a bypass module 1004 is provided between and connects to the high speed FLC module 540 and the processing device 500. An input to the bypass module 1004 receives a request from the processing device 500. The bypass module 1004 may be any type device capable of analyzing the request form the processor and classifying it as a request to be routed to the bypass path or routed to the high speed FLC module 540. The bypass module 1004 may comprise, but it not limited to, a state machine, a processor, control logic, ASIC, any other similar or equivalent device.

A first output from the bypass module 1004 connects to the FLC-HS controller 532. A second outputs from the bypass module 1004 connects to a multiplexer 1008. The multiplexer 1008 also receives a control signal on a control input 1012. The multiplexer 1008 may be any type switch configured to, responsive to the control signal, output one of the input signals at a particular time. The output of the multiplexer 1008 connects to the standard speed FLC controller 536 of the standard speed FLC module 542.

Operation of the bypass module 1004 and multiplexer 1008, in connection with the cascaded FLC modules as shown in FIG. 10, is discussed below in FIG. 11. In general, the bypass module 1004 analyzes the requests from the processing device 500 and determines whether the request qualifies as a request which should be bypassed to the standard speed FLC module 542 or directed to the high speed FLC module 540. If the request is determined to be a bypass type request, the request is re-directed by the bypass module 1004 to the multiplexer 1008, where it is selectively switched to the standard speed FLC module 536.

Figure 11:
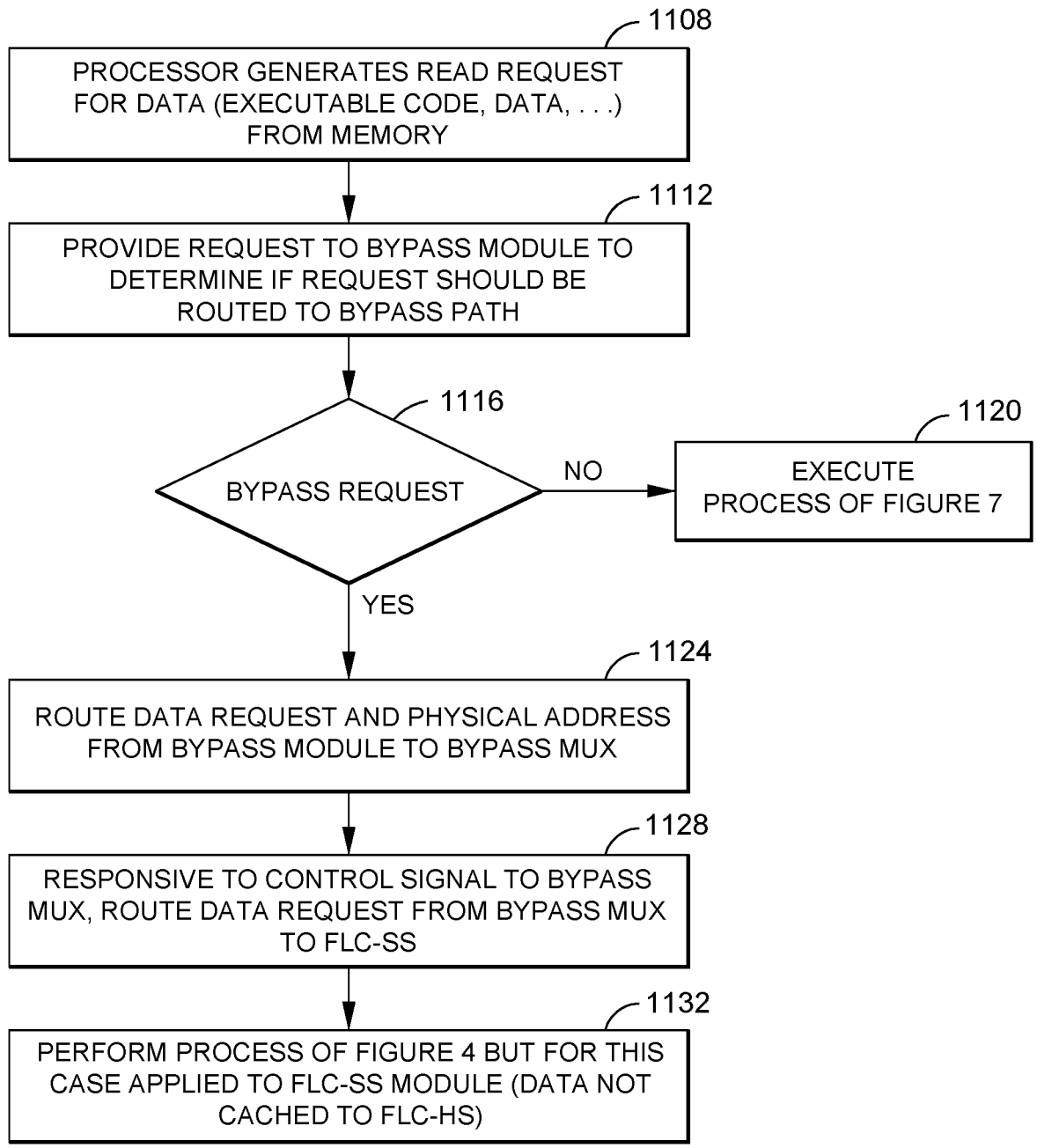
FIG. 11 is an operation flow diagram of an example method of operation of the split FLC modules as shown in FIG. 8.

FIG. 11 is an operation flow diagram of an example method of operation of the split FLC modules as shown in FIG. 8. This is but one example method of operation and other methods of operation are contemplated as would be understood by one of ordinary skill in the art. This method starts at step 1108 with the processing device generating a read request for data from memory. This step occurs in the traditional matter as is typical of processors requesting data from main memory, such as RAM. At a step 1112, the request from the processing device is provided to the bypass module for processing. The bypass module processes the request to determine if the request qualifies as or is classified as data that will bypass the high speed FLC module. Data or certain addresses may be classified to bypass the high speed FLC module for a number of different reasons.

In some embodiments, bypass data is data that is not used often enough to qualify, from a performance standpoint, for storage in the high speed DRAM. In other embodiments, certain physical addresses from the processing devices are designated as bypass addresses which the bypass module routes to the bypass path. This is referred to as fixed address mapping whereby certain addresses or blocks of addresses are directed to the bypass path. Similarly, the bypass decision could be based on data type as designated by the processor or other software/hardware function.

The bypass designation could also be based on a task ID, which is defined as the importance of a task. The task ID, defining the task importance, may be set by a fixed set of criteria or vary over time based on the available capacity of the DRAM-HS or other factors. A software engine or algorithm could also designate task ID. The bypass module may also be configured to reserve space in the DRAM-HS such that only certain task ID's can be placed in the reserved DRAM-HS memory space. To avoid never ending or needless blocking of caching to the DRAM-HS based on bypass module control, the task IDs or designation may time out, meaning the bypass designation is terminated after a fixed or programmable timer period. Task ID's could furthermore be used to define DRAM-HS cache line allocation capacity on per Task ID's basis. This is to prevent greedy tasks/threads from purging non-greedy tasks/threads and ultimately to enable a more balanced overall system performance. Operating Systems could also change the cache line allocation capacity table over time to reflect the number of concurrent tasks/threads that needs to simultaneously operate during a given period of time.

By way of example, a screen display showing active video play (movie) has a constantly changing screen display, but when not playing video, the screen display is static. As a result, the bypass module may be configured to bypass the active video display to the bypass path due to the video not being re-display more than once or twice to the screen. However, for a paused movie or during non-video play when the screen is static, the display data may be cached (not bypassed) since it is re-used over and over when refreshing the screen. Thus, it is best to have the data forming the static display in the FLC-HS module because FLC-HS module has lower power consumption. This can be done in software or hardware to detect if the screen is a repeating screen display.

In one embodiment, the bypass module includes algorithms and machine learning engines that monitor, over time, which data (rarely used or used only once) should be bypassed away from the high speed FLC module toward the standard speed FLC module. Over time the machine learning capability with artificial intelligence of the bypass module determines which data, for a particular user, is rarely used, or used only once, and thus should be bypassed away from the high speed FLC module. If the user, over time, uses that data more often, then the machine learning aspects of the bypass module will adjust and adapt to the change in behavior to direct that data to the high speed FLC module to be cached to maximize performance.

In one embodiment, the bypass module does not use machine learning or adapt to the user's behavior, instead the data or address which are bypassed to other than the high speed FLC module are fixed, user programmable, or software controlled. This is a less complicated approach.

It is also contemplated that the processing device may designate data to be bypass type data. As such, the request (read or write) from the processing device to the bypass module would include a designation as bypass type data. This provides a further mechanism to control which data is stored in the high speed FLC module, which has the flexibility of software control.

It is also contemplated and disclosed that the bypass designate for data may have a timer function which removes the bypass designation after a period of time, or after a period of time, the bypass designation must be renewed to remain active. This prevents the bypass designation from being applied to data that should no longer have the bypass designation.

Returning to FIG. 11, at decision step 1116, a determination is made whether the data is bypass data. If the data is not designated by the bypass module as data which should not by bypassed, then the operation advances to a step 1120. At step 1120 the operation executed the method FIG. 7, described above. Having been described above, the method steps of FIG. 7 are not repeated, but instead incorporated into this section of the application. As explained in FIG. 7, the method at this point progresses as if a cascaded FLC system.

Alternatively, if at decision step 1116 the bypass module determines that the data should be bypassed, then the operation advances to step 1124 and the data request with physical address is routed from the bypass module to the bypass multiplexer. In other embodiments, the data request and physical address may be routed to a bypass multiplexer. The bypass multiplexer (as well as other multiplexers disclosed herein) is a by-direction multiplexer that, responsive to a control signal, passes one of its inputs to its output, which in this embodiment connects to the standard speed FLC module. The other input to the bypass multiplexer is from the high speed FLC controller as shown in FIG. 10.

At a step 1128, responsive to the control signal to the bypass multiplexer, the bypass multiplexer routes the data request and physical address to the standard speed FLC-SS module. In other embodiments, the data request and physical address from the bypass multiplexer may be transferred to a different location, such as a different high speed FLC module or directly to the storage drive. Then, at a step 1132, the data request and physical address is processed by the standard speed FLC-SS module in the manner described in FIG. 4. Because this data is defined as bypass data, it is not cached in the DRAM-HS or the FLC-HS controller. The method of FIG. 4 is incorporated into this section of FIG. 11.

Figure 12:
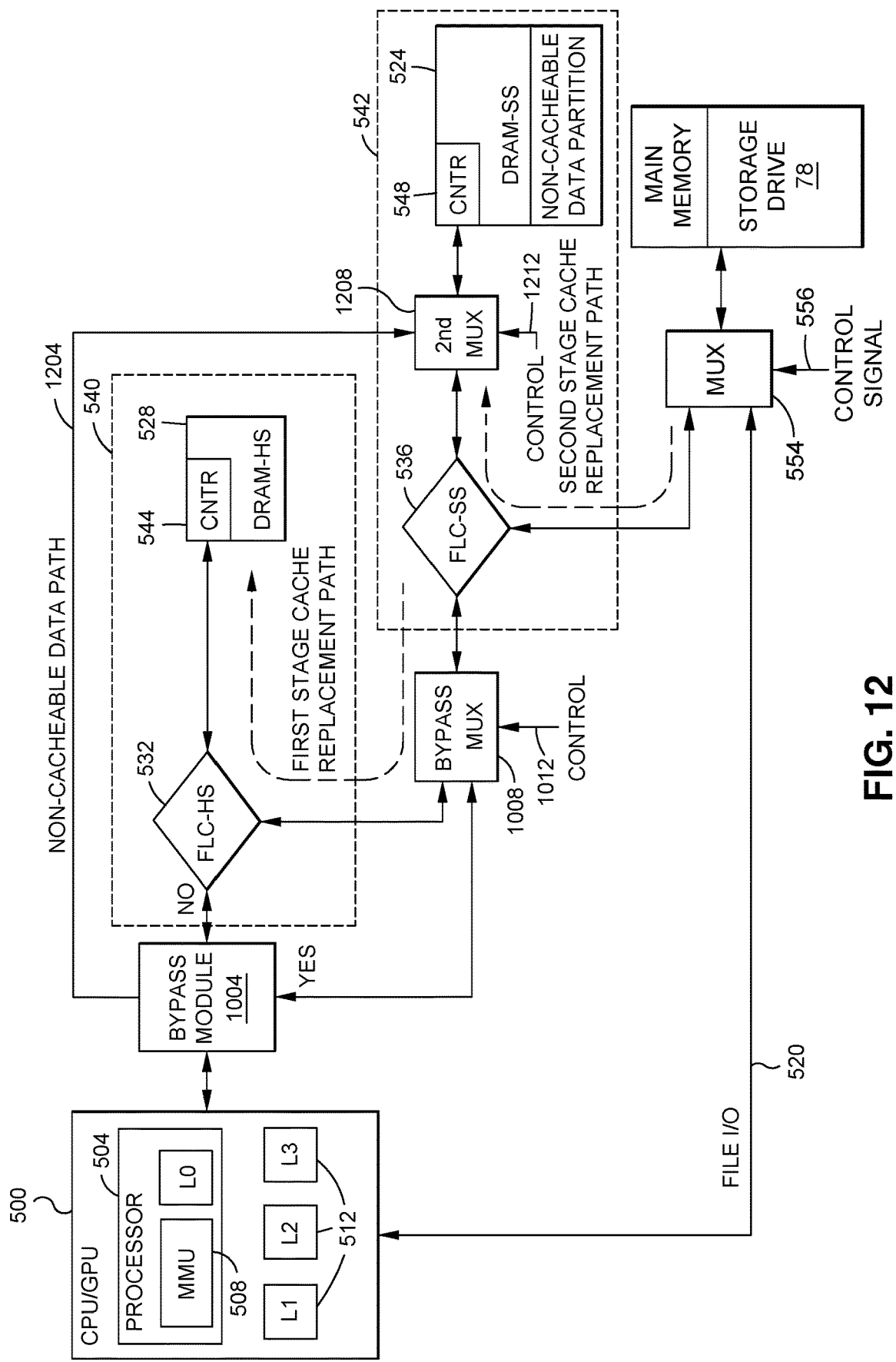
FIG. 12 is an exemplary block diagram of an example embodiment of a cascaded FLC system with a bypass path and non-cacheable data path.

FIG. 12 is an exemplary block diagram of an example embodiment of a cascaded FLC system with a bypass path and non-cacheable data path. As compared to FIGS. 5A and 10, identical elements are labeled with identical reference numbers. This example embodiment is but one possible configuration for a system that separately routes non-cacheable data and, as such, one of ordinary skill in art may arrive at other embodiments and arrangements. Added to this embodiment, beyond the configuration of FIG. 10, is a non-cacheable data path 1204 that connects between the bypass module 1004 and a second multiplexer 1208. The second multiplexer 1208 include a control signal input 1212 configured to provide a control signal to the multiplexer. The control signal 1212 for the second multiplexer 1208 determines which of the two inputs to the second multiplexer is outputs to the DRAM-SS 524.

In this embodiment, a portion of the DRAM-SS 524 is partitioned to be reserved as non-cacheable memory. In the non-cacheable data partition of the DRAM-SS, non-cacheable data is stored. As such, the non-cacheable data partition operates as traditional processor/DRAM. If the processor requests non-cacheable data, such as a video file which is typically viewed once, then the file is retrieved by the processor over the file I/O path 520 from the storage drive 78 and provided to the non-cacheable partition of the DRAM-SS. This data now stored in the DRAM-SS may then be retrieved by the processor in smaller blocks, over the non-cacheable data path. A video file, such as a movie, is typically very large and is typically only watched once, and thus not cached because there would be no performance benefit to caching data used only once. Partitioning a portion of a memory is understood by one of ordinary skill in the art and as such, this process is not described in detail herein. The non-cacheable data could also be stored in the storage drive 78.

In this embodiment the bypass module 1004 is further configured to analyze the read request and determine if the read request is for data classified as non-cacheable data. If so, then the data read request from the processing device 500 is routed to the second multiplexer 1208 through non-cacheable data path 1204. The second multiplexer 1208, responsive to the control signal, determines whether to pass, to the DRAM-SS 524 either the non-cacheable data read request or the request from the standard speed FLC-SS controller 536. Because the data is non-cacheable, after the data is provided to the processor, the data is not cached in either the DRAM-HS 528 or the DRAM-SS 524, but could be stored in the non-cacheable data partition of the DRAM-SS.

Figure 13:
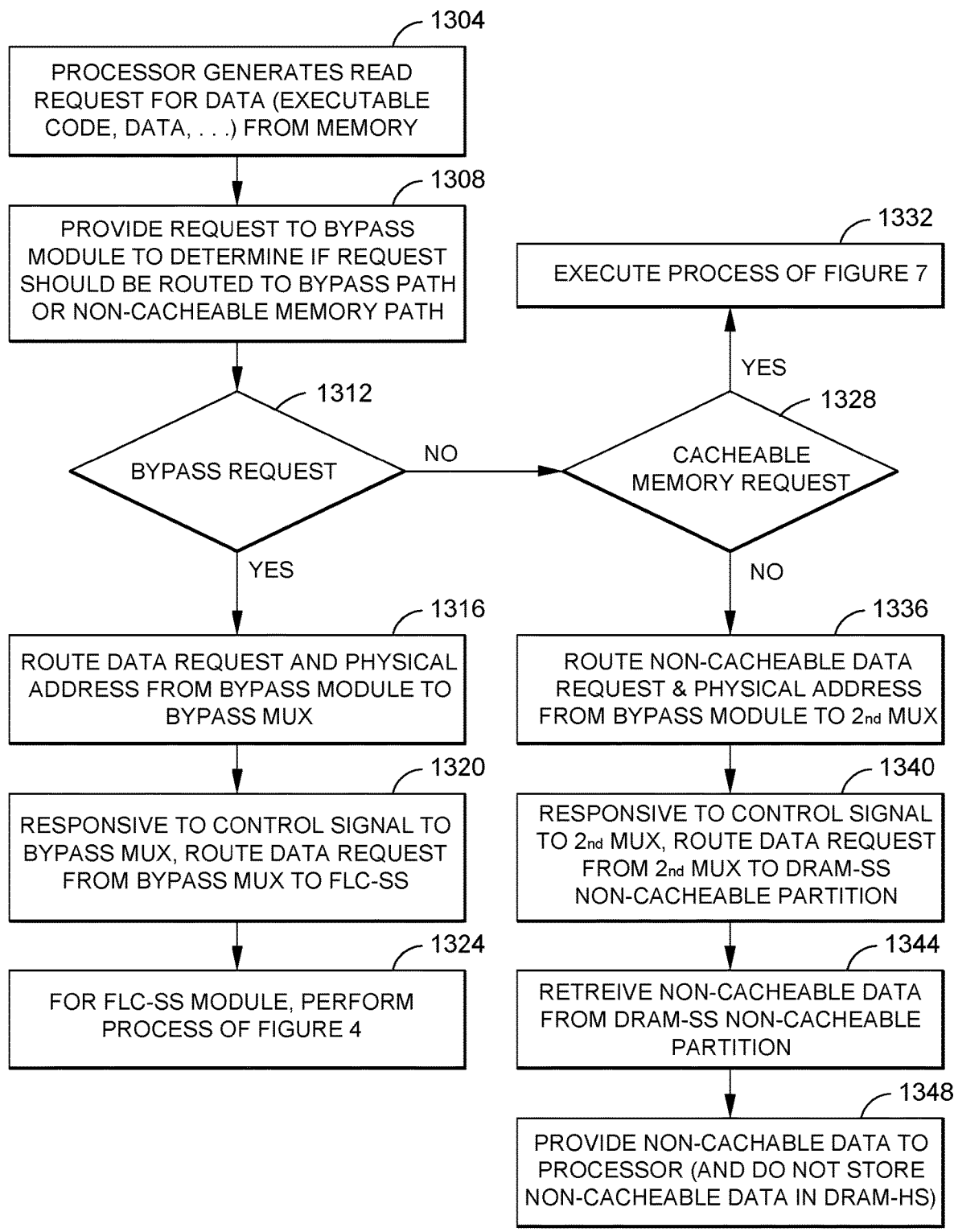
FIG. 13 provides operational flow chart of an exemplary method of operation for the embodiment of FIG. 12.

FIG. 13 provides operational flow chart of an exemplary method of operation for the embodiment of FIG. 12. This is but one example method of operation and other methods of operation are contemplated as would be understood by one of ordinary skill in the art. The method of operation is similar to the method of FIG. 11 with the additional steps directed to processing non-cacheable data. At a step 1304, the processing device generates a read request for data stored in memory. The request includes a physical address. Then at a step 1308 the request and physical address are provided to the bypass module to determine if the request should be routed to the bypass path or if the request is a request for non-cacheable data and thus should be routed to a non-cacheable data path. At a decision step 1312, a determination is made whether the data request should be routed to the bypass path. If the determination is made that the request is a bypass data type request, then the operation advances to step 1316 and the bypass module routes the data request and physical address from the bypass module to the bypass multiplexer. The bypass multiplexer may be any device capable of receiving two or more inputs and selectively routing one of the inputs to an output. The bypass multiplexer is bi-directional so a signal at the multiplexers single output may be routed to either input path. A bypass multiplexer control signal on input 1012 controls operation of the bypass multiplexer.

Thereafter, at a step 1320, responsive to a control signal provided to the bypass multiplexer, the data request with physical address is routed from the bypass multiplexer to the FLC-SS module. Then at step 1324 the FLC-SS module processes the data request and physical address as described in FIG. 4. The method of FIG. 4 is incorporated into FIG. 13.

Alternatively, if at decision step 1312 it is determined that the bypass criteria was not satisfied, then the operation advances to decision step 1328 where it is determined if the requested is a cacheable memory request. A cacheable memory request is a request from the processing device for data that will be cached in one of the FLC modules while a non-cacheable memory request is for data that will not be cached. If the request is for cacheable memory, then the operation advances to step 1332 and the process of FIG. 7 is executed based on the data request and physical address. The method of FIG. 7 is incorporated into FIG. 13.

Alternatively, if at step 1328 the requested data is determined to be non-cacheable, then the operation advances to step 1336. At step 1336 the non-cacheable data request including the physical address is routed from the bypass module to a second multiplexer. The second multiplexer may be configured and operate generally similar to the bypass multiplexer. At a step 1340, responsive to a second multiplexer control signal, the data request and physical address from the second multiplexer is provided to the DRAM-SS controller which directs the request to a partition of the DRAM-SS reserved for non-cacheable data. At a step 1344 the FLC-SS controller retrieves the non-cacheable data from the DRAM-SS non-cacheable data partition and at step 1348 the FLC-SS controller provides the non-cacheable data to the processing device. The retrieved data is not cached in the DRAM-HS cache or the DRAM-SS cache, but may be maintained in the non-cacheable partition of the DRAM-SS. As such, it is not assessable through the FLC-SS module but is instead accessed through the non-cacheable data path.

It is contemplated and disclosed that any of the embodiments, elements or variations described above may be assembled or arranged in any combination to form new embodiments. For example, as shown in FIG. 6, the parallel FLC module arrangements (FLC slices) may be combined with two or more stages of FLC modules. Any of these embodiments may be assembled or claimed with the bypass module features and/or the non-cacheable data path. It is also contemplated that the more than two stages of FLC modules (such as three or four FLC module stages) may be combined with any other elements shown or described herein.

It is also understood that although the flow charts and methods of operation are shown and discussed in relation to sequential operation, it is understood and disclosed that various operation may be occurring in parallel. This increases the speed of operation, bandwidth, and reduces latency in the system.

The wireless communication aspects described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

Although the terms first, second, third, etc. may be used herein to describe various chips, modules, signals, elements, and/or components, these items should not be limited by these terms. These terms may be only used to distinguish one item from another item. Terms such as "first," "second," and other numerical terms when used herein do not imply a sequence or order unless clearly indicated by the context. Thus, a first item discussed below could be termed a second item without departing from the teachings of the example examples.

Also, various terms are used to describe the physical relationship between components. When a first element is referred to as being "connected to", "engaged to", or "coupled to" a second element, the first element may be directly connected, engaged, disposed, applied, or coupled to the second element, or intervening elements may be present. In contrast, when an element is referred to as being "directly connected to", "directly engaged to", or "directly coupled to" another element, there may be no intervening elements present. Stating that a first element is "connected to", "engaged to", or "coupled to" a second element implies that the first element may be "directly connected to", "directly engaged to", or "directly coupled to" the second element. Other words used to describe the relationship between elements should be interpreted in a like fashion (e.g., "between" versus "directly between", "adjacent" versus "directly adjacent", etc.).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' and the term 'controller' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

A module or a controller may include one or more interface circuits. In some examples, the interface circuits may include wired or wireless interfaces that are connected to a local area network (LAN), the Internet, a wide area network (WAN), or combinations thereof. The functionality of any given module or controller of the present disclosure may be distributed among multiple modules and/or controllers that are connected via interface circuits. For example, multiple modules and/or controllers may allow load balancing. In a further example, a server (also known as remote, or cloud) module or (remote, or cloud) controller may accomplish some functionality on behalf of a client module and/or a client controller.

The term code, as used above, may include software, firmware, and/or microcode, and may refer to programs, routines, functions, classes, data structures, and/or objects. The term shared processor circuit encompasses a single processor circuit that executes some or all code from multiple modules and/or controllers. The term group processor circuit encompasses a processor circuit that, in combination with additional processor circuits, executes some or all code from one or more modules and/or controllers. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules and/or controllers. The term group memory circuit encompasses a memory circuit that, in combination with additional memories, stores some or all code from one or more modules and/or controllers.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are non-volatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

U.S. Provisional Patent Application No. 62/686,333 titled Multi-Path or Multi-Stage Cache Improvement filed on Jun. 18, 2018, is incorporated by reference in its entirety herein and the contents of the incorporated reference, including figures, should be considered as being part of this patent application.

What is claimed is:

1. A data storage and access system for use with a processor comprising:
    a processor, having processor cache, the processor configured to generate a data request for data;
    a final level cache (FLC) cache system, configured to function as main memory and receive the data request, the FLC system comprising:
        a first FLC module having a first FLC controller and first memory, the first FLC module receiving the data request from the processor;
        a second FLC module having a second FLC controller and second memory, the second FLC module receiving, responsive to the first FLC module not having the data requested by the processor, the data request from the first FLC module; and
    a storage drive configured with a main memory portion such that the storage drive receives the data request responsive to the second FLC module not having the data requested.

2. The system of claim 1 wherein the data request includes a physical address and first FLC controller includes a look-up table configured to translate the physical address to a first virtual address.

3. The system of claim 2 wherein if the first FLC controller look-up table does not contain the physical address, the first FLC controller is configured to forward the data request with the physical address to the second FLC controller.

4. The system of claim 3 wherein the second FLC controller includes a look-up table configured to translate the physical address to a second virtual address.

5. The system of claim 4 wherein if the second FLC controller look-up table does not contain the physical address, the second FLC controller is configured to forward the data request with the physical address to the storage drive.

6. The system of claim 1 wherein the first FLC module is faster and has lower power consumption than the second FLC module.

7. The system of claim 1 wherein the first memory is DRAM and includes a first memory controller and the second memory is DRAM and includes a second memory controller.

8. The system of claim 1 wherein the storage drive is a magnetic disk driver, solid state memory or a hybrid drive.

9. The system of claim 7 wherein the DRAM is serial DRAM.

10. The system of claim 1 wherein the first FLC module is at least two times as fast as the second FLC module.

11. The system of claim 1 wherein the first FLC module and the second FLC module are configured to perform predictive fetching of data stored at addresses expected to be accessed in the future.

12. A data storage and access system for use with a processor comprising:
- a processor, having processor cache, the processor configured to generate a first data request for first data and a second data request for second data;
- a first final level cache (FLC) cache system, communicating with the processor, configured to function as main memory cache and receive the first data request for the first data;
- a second FLC cache system, communicating with the processor, configured to function as main memory cache and receive the second data request for the second data;
- a storage drive configured with a main memory partition such that the main memory partition of the storage drive functions as main memory.

13. The system of claim 12 further comprising a system bus and the processor communicates with the first FLC cache system and the second FLC cache system over the system bus such that addresses assigned to each FLC cache system are interleaved.

14. The system of claim 12 wherein:
- if the first data is not contained in the first FLC cache system, then the first data request is sent to the storage drive to retrieve the first data from the main memory partition of the storage drive; and
- if the second data is not contained in the second FLC cache system, then the second data request is sent to the storage drive to retrieve the first data from the main memory partition of the storage drive.

15. The system of claim 12 wherein the first FLC cache system comprises a first FLC module and a second FLC module and the second FLC cache system comprises a third FLC module and a fourth FLC module.

16. The system of claim 15 wherein each of the FLC modules comprises a FLC controller and a memory.

17. The system of claim 16 wherein the each FLC module maintains dedicated and unique look-up tables.

* * * * *